(12) United States Patent
Sweet et al.

(10) Patent No.: US 12,057,562 B2
(45) Date of Patent: Aug. 6, 2024

(54) BATTERY PACK FOR AERIAL VEHICLE

(71) Applicant: Joby Aero, Inc., Santa Cruz, CA (US)

(72) Inventors: Edward Thomas Sweet, San Francisco, CA (US); Luke Asher Wilhelm, Sausalito, CA (US); Thomas Bloxham, San Francisco, CA (US); Mischa Alec Pollack, Morro Bay, CA (US); Alexander Andrew Bonderanko, San Francisco, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 133 days.

(21) Appl. No.: 17/119,491

(22) Filed: Dec. 11, 2020

(65) Prior Publication Data

US 2021/0184290 A1 Jun. 17, 2021

Related U.S. Application Data

(60) Provisional application No. 62/706,611, filed on Aug. 28, 2020, provisional application No. 62/948,190, filed on Dec. 13, 2019.

(51) Int. Cl.
*H01M 10/6552* (2014.01)
*H01M 10/625* (2014.01)
(Continued)

(52) U.S. Cl.
CPC ..... *H01M 10/6552* (2015.04); *H01M 10/625* (2015.04); *H01M 10/653* (2015.04); *H01M 50/20* (2021.01); *H01M 2220/20* (2013.01)

(58) Field of Classification Search
CPC .......... H01M 10/6552; H01M 10/625; H01M 10/653; H01M 50/20; H01M 2220/20
See application file for complete search history.

(56) References Cited

U.S. PATENT DOCUMENTS

2009/0208829 A1 8/2009 Howard et al.
2015/0306974 A1 10/2015 Mardall et al.
(Continued)

FOREIGN PATENT DOCUMENTS

CN 101950823 1/2011
CN 206471454 9/2017
(Continued)

OTHER PUBLICATIONS

"International Application Serial No. PCT US2020 064556, Invitation to Pay Additional Fees mailed Mar. 18, 2021", 11 pgs.
(Continued)

*Primary Examiner* — James Lee
(74) *Attorney, Agent, or Firm* — SCHWEGMAN LUNDBERG & WOESSNER, P.A.

(57) ABSTRACT

A battery pack includes a cassette stack comprising a plurality of battery cell cassettes, each of the cassettes including a plurality of support structures. Each support structure comprises an electrically and thermally conductive frame for receiving at least one battery cell having a first terminal and a second terminal, and a heat pipe. The first terminal is electrically coupled to the frame when the at least one battery cell is mounted in the frame. The heat pipe provides thermal conductivity between the frame and a cooling surface. A method of cooling an electric vehicle including a battery pack comprises aligning the battery pack and a cooling structure, moving the cooling structure into contact with the electric vehicle, and circulating coolant through the cooling structure.

11 Claims, 34 Drawing Sheets

(51) Int. Cl.
*H01M 10/653* (2014.01)
*H01M 50/20* (2021.01)

(56) References Cited

U.S. PATENT DOCUMENTS

2018/0006282 A1* 1/2018 Favaretto ............ H01M 50/271
2019/0312323 A1 10/2019 Dellon et al.

FOREIGN PATENT DOCUMENTS

| | | |
|---|---|---|
| CN | 208507777 | 2/2019 |
| DE | 102011001922 | 10/2012 |
| DE | 102017203250 | 9/2017 |
| JP | H10208781 | 8/1998 |
| JP | 2006155989 | 6/2006 |

OTHER PUBLICATIONS

"International Application Serial No. PCT US2020 064556, International Search Report mailed Jul. 12, 2021", 7 pgs.
"International Application Serial No. PCT US2020 064556, Written Opinion mailed Jul. 12, 2021", 9 pgs.

* cited by examiner

BATTERY PACK FOR AERIAL VEHICLE

RELATED APPLICATION DATA

This application claims the benefit of U.S. Provisional Patent Application No. 62/948,190 filed on Dec. 13, 2019 and U.S. Provisional Patent Application No. 62/706,611 filed on Aug. 28, 2020, the contents of which are hereby incorporated by reference in their entireties.

BACKGROUND

With the increased interest in electrically powered aerial vehicles, such as electric vertical takeoff and landing (eV-TOL) aerial vehicles (AVs), a number of technical challenges have arisen with respect to the construction of battery packs for these aerial vehicles. For example, it is desirable to minimize the weight of battery packs in order to increase the range of electrically powered aerial vehicles.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
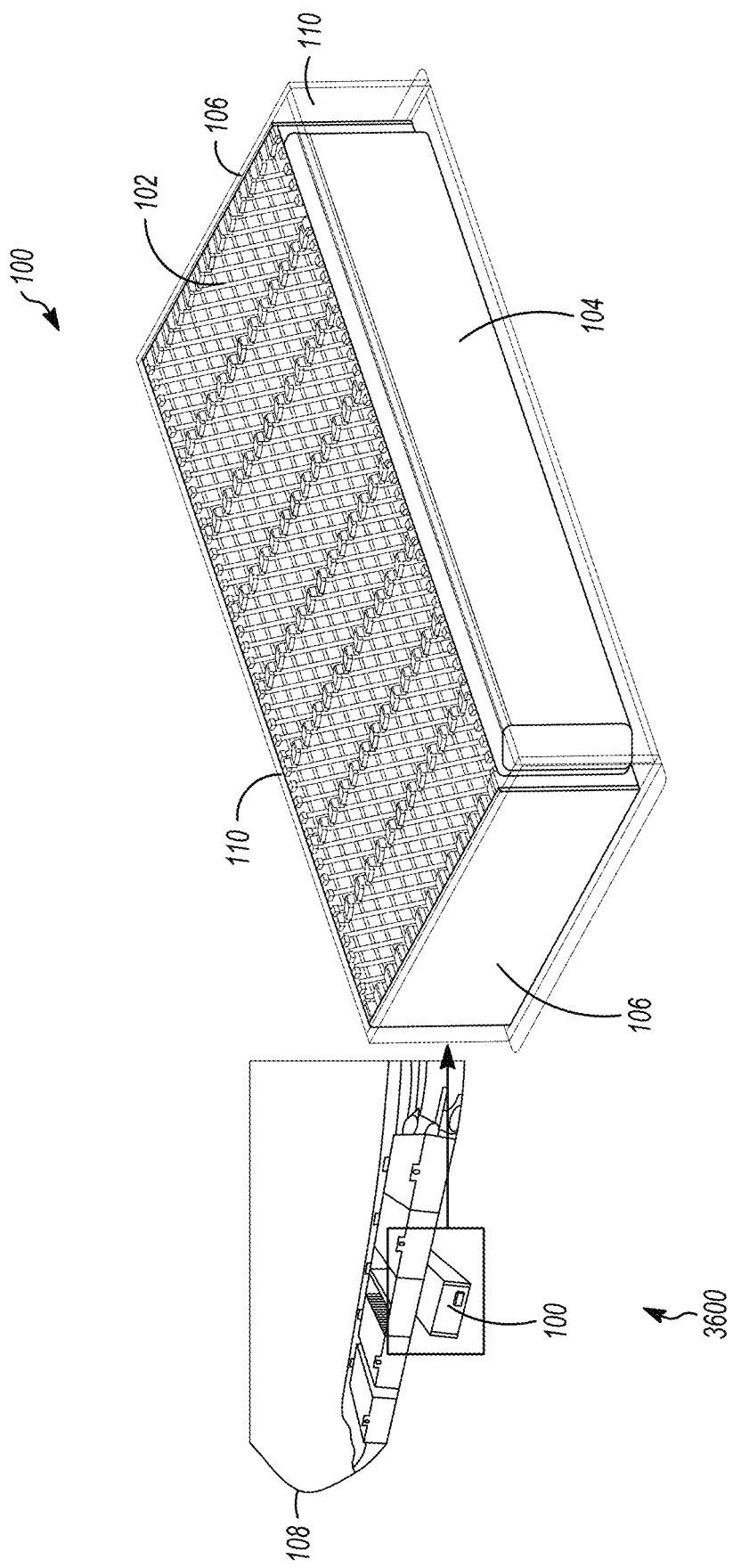
FIG. 1 illustrates a battery pack in accordance with one example.

According to some examples, there is provided a battery pack for an electrically powered aerial vehicle (AV) (e.g., a vertical takeoff and landing (VTOL) AV) having a fuselage, and a number of electric motors that power rotors of the AV, the electric motors being coupled to the battery pack. The battery pack, in turn, includes a cassette stack that includes a number of battery cell cassettes and a housing to receive and accommodate the cassette stacks.

Each battery cell cassette includes a collection of cylindrical battery cells secured by support structures, which are thermally attached to the housing so as to operationally provide a heat path from the battery cells to a surface of the housing. Operationally, the surface of the housing may be exposed to airflow during the flight of the aerial vehicle, and also to ground-based cooling systems when the aerial vehicle is docked at a base station.

The support structures and housing, in addition to providing the heat paths, may also provide electrical paths between battery cells in the battery cell cassette.

The support structures orient the cylindrical battery cells in an axially stacked configuration so that vents of the battery cells do not point towards each other, but instead point away from each other in diametrically opposite directions.

More specifically, in one example, disclosed is a support structure for a battery pack, comprising an electrically and thermally conductive frame to receive at least one battery cell having a first terminal and a second terminal, and a heat pipe. The first terminal is electrically coupled to the frame when the at least one battery cell is mounted in the frame. The heat pipe provides thermal conductivity between the frame and a cooling surface.

The frame may receive at least first and second battery cells in an axially stacked configuration with a vent of the at least first battery cell facing in an opposite direction to a vent of the at least second battery cell. The support structure may further comprise a first electrically-conductive structure to electrically couple the frame to a terminal of at least one battery cell in an adjacent frame, as well as a second electrically conductive structure to electrically couple the second terminal to an adjacent frame. The support structure may further comprise an electrically conductive structure to electrically couple the second terminal to an adjacent frame.

The support structure may also include least one foot to thermally couple the heat pipe to the cooling surface, the foot being electrically insulated from the cooling surface. Additionally, the frame may comprise at least a first cross member and a second cross member to receive the at least one battery cell, and at least one vertical member to connect the first and second cross members. The heat pipe, comprising a metal rod, may be located within the vertical member.

The support structure may further comprise at least one bridge to couple the frame to at least one other frame, the support structures being couplable one to another via the bridge. The at least one bridge may comprise a chassis. The support structure in use may be coupled to the at least one bridge via the at least one battery cell. The at least one bridge may also comprise a plurality of bridges to couple adjacent support structures one to another to form a battery cassette. The at least one bridge may be configured to couple adjacent support structures to each other so that the adjacent support structures face in opposite directions in a battery cassette.

The support structure may further comprise a first electrically-conductive structure to electrically couple the frame to a terminal of at least one battery cell in a first adjacent battery cassette, and a second electrically conductive structure to electrically couple the second terminal to an adjacent frame in a second adjacent battery cassette. The support structure may further comprise an electrically conductive structure to electrically couple the second terminal to an adjacent frame in an adjacent battery cassette.

Also disclosed is a battery pack including a cassette stack comprising a plurality of battery cell cassettes, each of the cassettes including a plurality of support structures. Each support structure comprises an electrically and thermally conductive frame for receiving at least one battery cell having a first terminal and a second terminal, and a heat pipe. The first terminal is electrically coupled to the frame when the at least one battery cell is mounted in the frame. The heat pipe provides thermal conductivity between the frame and a cooling surface.

The frame may receive at least first and second battery cells in an axially stacked configuration with a vent of the at least first battery cell facing in an opposite direction to a vent of the at least second battery cell. The support structure may include a first electrically-conductive structure to electrically couple the frame to a terminal of at least one battery cell in an adjacent frame, and a second electrically conductive structure to electrically couple the second terminal to an adjacent frame. The adjacent frame may be in an adjacent cassette.

Further, a method of cooling an electric vehicle including a battery pack comprises aligning the battery pack and a cooling structure, moving the cooling structure into contact with the electric vehicle, and circulating coolant through the cooling structure.

The cooling structure may comprise a trough having spray heads and the circulating of the coolant may include spraying the coolant against a surface of the battery pack or the electric vehicle. The trough may include a resilient seal along an upper perimeter of the trough.

The cooling structure may comprise a block having channels defined therein through which the coolant circulates, and the cooling structure may include a resilient pad that contacts the electric vehicle.

Additionally, a battery pack includes a cassette stack having multiple battery cell cassettes, each of the cassettes including a battery cassette spine to secure respective first and second pluralities of battery cells. A first plurality of battery cells is secured in a first orientation such that vents of each of the first plurality of battery cells are oriented in a first direction away from the second plurality of battery cells. A second plurality of battery cells is secured in a second orientation such that that vents of each of the second plurality of battery cells are oriented in a second direction away from the first plurality of battery cells. A housing receives the cassette stack, the housing including a first housing panel thermally coupled to the cassette stack, and to electrically insulate electrical paths between battery cells of the cassette stack.

FIG. 1 provides perspective views of a battery pack 100, according to some examples, the battery pack 100 forming part of a collection of battery packs 100 accommodated within a fuselage 108 of an aerial vehicle 3600. In the example provided in FIG. 1, five battery packs 100 are mounted under the fuselage 108. Ducted airflows are provided, within the aerial vehicle 3600, above the collection of battery packs 100, while free airflow operationally provides cooling below the collection of battery packs 100 during flight of the aerial vehicle 3600. Specifically, a battery cavity is provided within the fuselage 108 into which five battery packs 100 can be removably inserted and secured, with bottom covers of the battery packs 100 being exposed directly to airflow.

Each battery pack 100, according to one example, comprises a cassette stack 102 (including battery cell cassettes) and a battery management system (BMS) module 104, accommodated within a housing having top and bottom covers, a pair of end structures 106, and a pair of cross structures 110. The end structures 106 provide mechanical connections and live electrical connections on the short side of the battery pack 100.

As will be described with reference to the drawings, the battery cell cassettes of the battery pack 100 include two layers of cylindrical battery cells which are stacked axially within the battery pack 100, and that are secured within the battery pack 100 by support structures that conduct thermal energy from the battery cells to the top and bottom covers of the housing of the battery pack 100.

Figure 2:
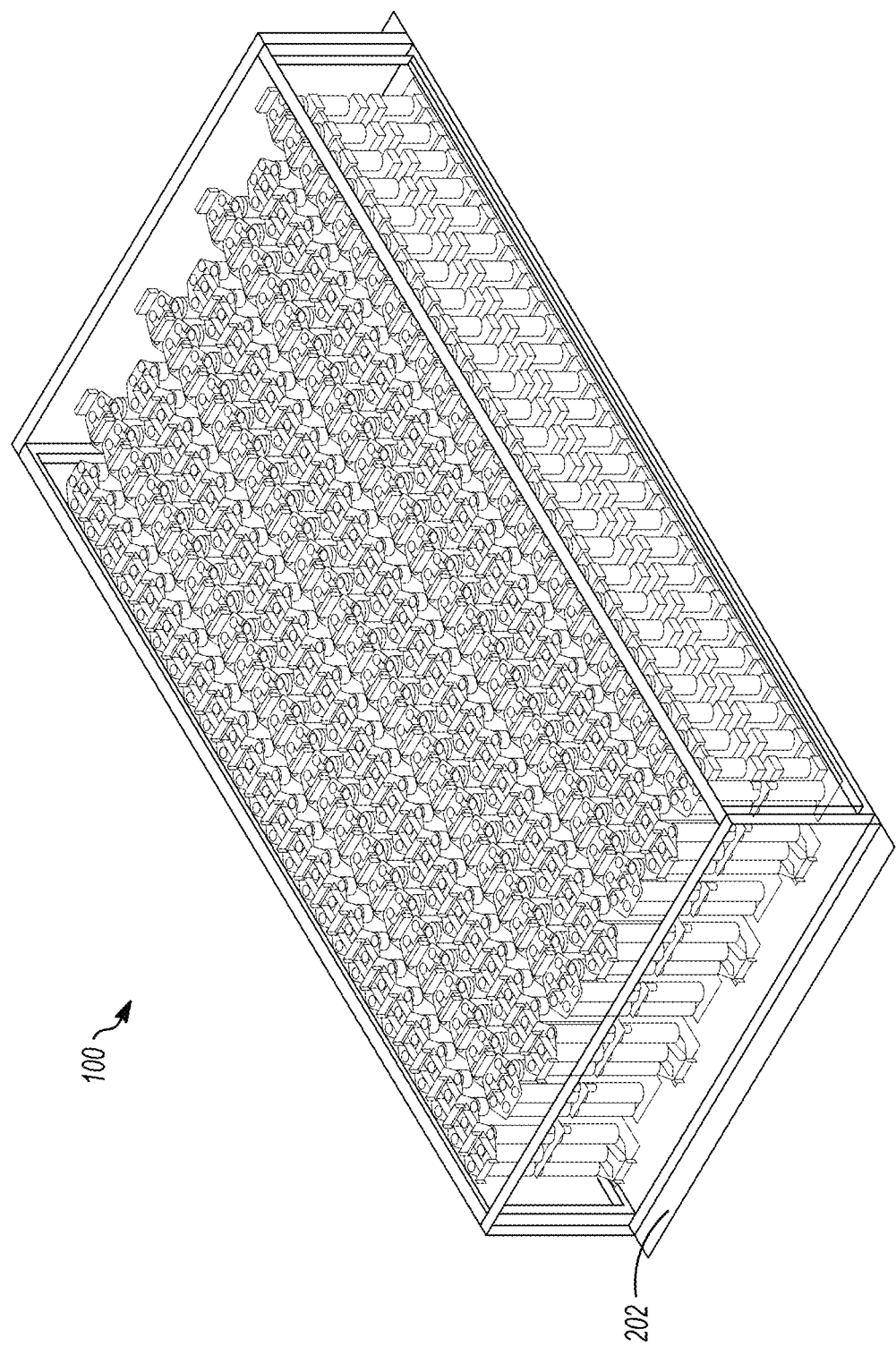
FIG. 2 illustrates aspects of the battery pack in accordance with one example.

FIG. 2 is a perspective view of a battery pack 100, according to some examples, and shows further details regarding its structure.

Within the battery pack 100, two layers of battery cells are stacked axially, with vents of battery cells of each layer pointing away from the other layer.

Figure 3:
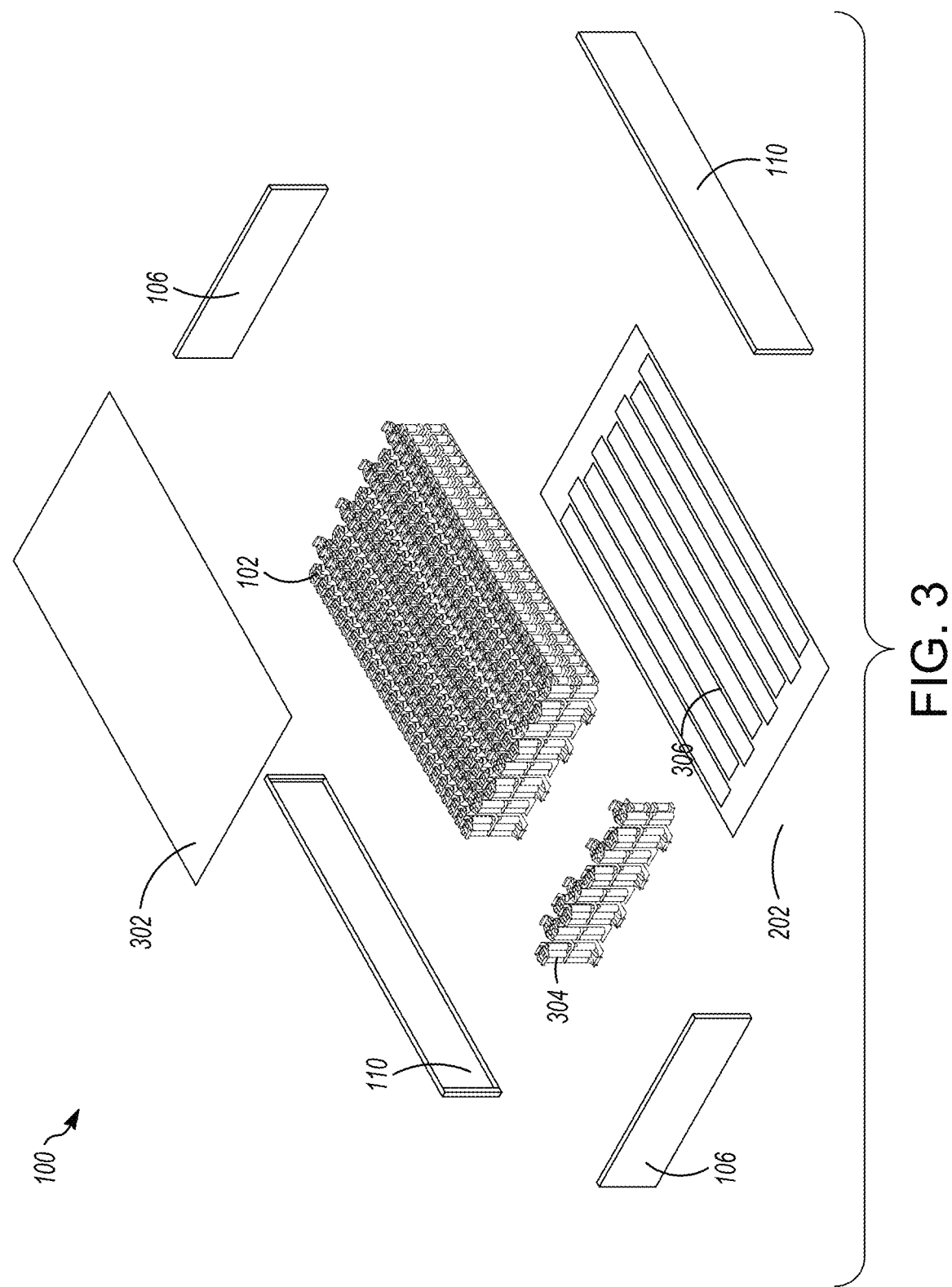
FIG. 3 illustrates aspects of battery pack in accordance with one example.

FIG. 3 is an exploded view of a battery pack 100, which illustrates further details of an example structure. The battery pack 100 comprises a cassette stack 102, which is contained within a housing. The cassette stack 102 is constructed of 25 battery cassettes 304, each of which in turn includes 80 cylindrical battery cells secured within a collection of interconnected support structures 402.

The housing includes a top cover 302, a pair of end structures 106, a pair of cross structures 110, and a bottom cover 202. These components are connected and welded together (or otherwise sealed together) to create an environmental seal around the cassette stack 102. Each of the cross structures 110 attaches to the cassette stack 102, and provides a load path to the pair of end structures 106.

The end structures 106 are attached to the cross structures 110, and provide a load path to mounts within the battery cavity of an aerial vehicle 3600.

The bottom cover 202 has a series of longitudinally extending electrical insulators 306 defined on an inside surface thereof. The electrical insulators 306 provide electrically insulated thermal paths from the support structures 402, and specifically heat pipes 406 that form part of the support structures 402 in each battery cassette 304, to the bottom cover 202.

The bottom cover 202 may be used to support from both active and passive heat extraction from the battery pack 100. Specifically, the bottom cover 202 may be exposed as an outer surface of an aerial vehicle, and thus subject to high velocity airflow during flight of an aerial vehicle. This high velocity airflow is effective in passively extracting heat from the battery pack 100. When the aerial vehicle is landed and docked, an active cooling system may furthermore thermally engage the bottom cover 202, so as to actively extract thermal energy from the battery pack 100.

Figure 4:
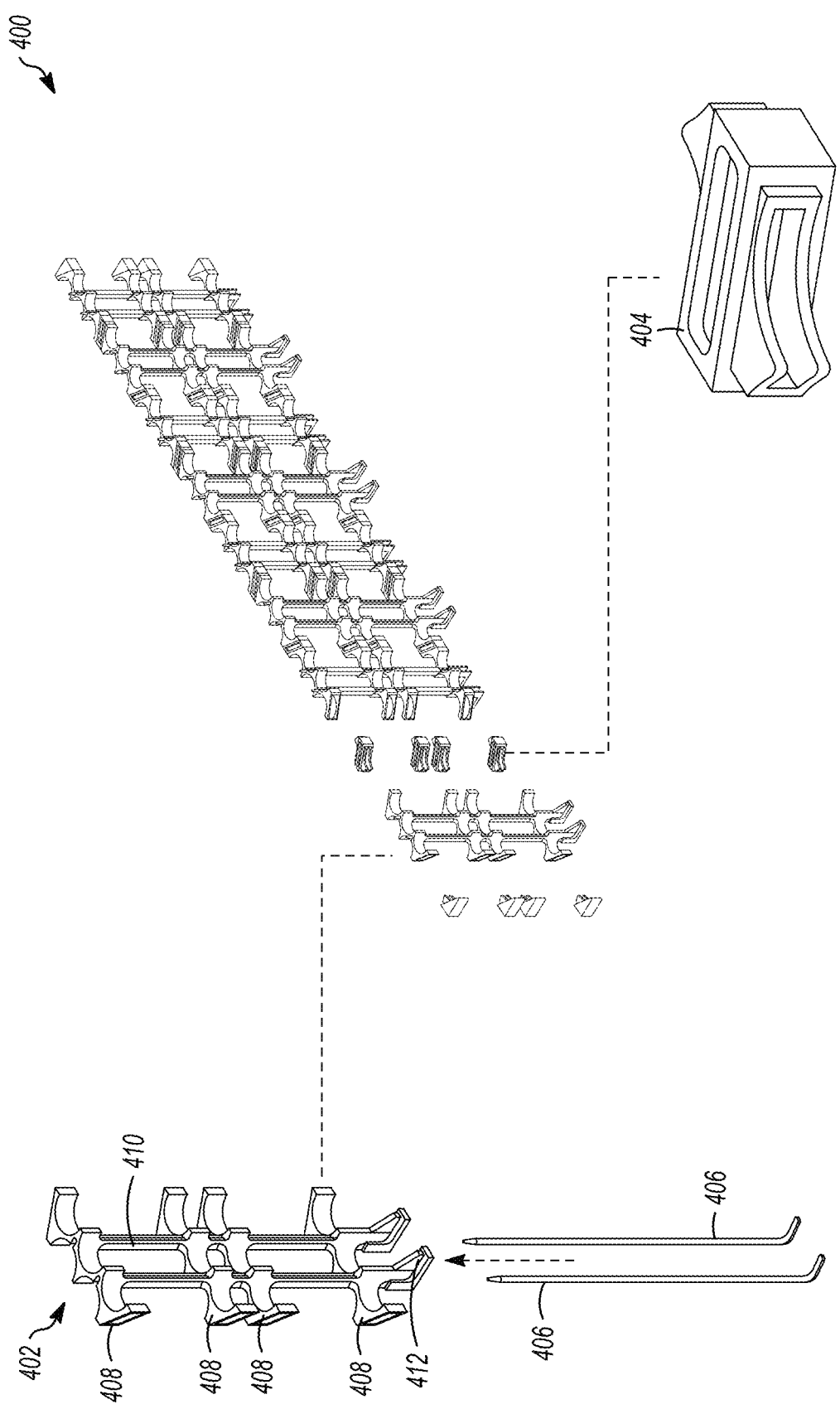
FIG. 4 illustrates a cassette spine in accordance with one example.

The two layers of battery cells are secured within the battery pack 100 using multiple support structures 402 as shown in FIG. 4, which are connected in a series to form a cassette spine 400. The support structures 402 are thermally connected to the battery cells, and conduct heat passively from the battery cells to the bottom cover 202 of the battery pack 100. In alternative examples, the support structures 402 may also be thermally connected to other surfaces of the battery pack 100, so as to channel thermal energy to these surfaces. In the example, lower ends of the support structures 402 are welded (or otherwise thermally connected) to the thermally conductive electrical insulators 306 that create a favorable thermal connection between battery cells and the bottom cover 202, and that also electrically isolate battery cells that would otherwise cause a short circuit (e.g., between an adjacent group of ten battery cells in a battery cassette 304).

FIG. 4 provides exploded perspective views of a cassette spine 400, according to some examples, which is constructed from a series of connected or bridged support structures 402. Each support structure 402 includes a frame that has four cross members 408 supported by a pair of vertical members 410. Each cross member 408 in turn includes three recesses on one side to accommodate a group of three cell batteries, and two recesses on the other side to accommodate a group of two cell batteries. In an example, a single support structure 402 is able to accommodate and hold ten cylindrical battery cells, five at the bottom and five at the top. The recesses are, as shown in FIG. 4 are, semicircular in shape to accommodate cylindrical battery cells.

The arrangement of support structures 402 when assembled to form cassette spines 400 provides a cassette-based architecture for the battery pack 100, with a series of support structures 402 each accommodating ten cylindrical battery cells and being connected in series to form cassette-based subassemblies (e.g. a battery cassette 304).

The support structure 402 is constructed of a material that is both a good thermal and electrical conductor, (e.g. aluminum or some other metal).

As will be described in further detail with respect to a subsequent figure, all five cells in an upper or lower group of five battery cells in the ten cylindrical battery cells that are mounted to a single support structure 402 are connected in parallel, so that the fives cells are all at the same electrical potential. This allows a group of ten mounted battery cells to be conveniently connected as discussed in more detail below.

Each vertical member 410 has a foot 412 to facilitate thermal and electrical coupling to an electrical insulator 306. Each vertical member 410 also includes a longitudinally extending hollow chamber, into which is soldered a heat pipe 406. In one example, the heat pipe 406 is a metal tube made out of copper and is bent at the bottom so as to be snugly accommodated within a foot 412 of a vertical member 410, and to provide solid thermal coupling to a heat sink (e.g., an electrical insulator 306 thermally coupled to a bottom cover 202). The heat pipes 406 are conventional in nature and include an appropriate working fluid, (e.g. water) and internal wicking structure. Depending on the required heat flux and temperature range, heat pipes of various enclosure materials (i.e. aluminum, steel, titanium, copper, etc.) and working fluids (i.e. acetone, methanol, water, etc.) could be used. In another example, the hollow chamber in each of the vertical members 410 may be partially filled with water or another working fluid in order to partially establish a heat pipe.

In order to construct the cassette spine 400, multiple support structures 402 are connected to each other using bridges 404, which have respective tongues and grooves defined on opposite surfaces thereof to engage with corresponding tongues and grooves defined on a cross member 408 of a support structure 402. As illustrated, the bridges 404 are bonded into the support structures 402 in order to physically couple, but electrically insulate, support structures 402 from each other. In order to provide electrical insulation, a bridge 404 is made of an electrically insulating material, such as an injection molded plastic. A series of eight support structures 402 may be connected in an alternating orientations to form the cassette spine 400. Adjacent groups of ten cylindrical battery cells, mounted on respective support structures 402, will operationally be at different electrical potentials, with the bridges 404 serving to electrically insulate these mounted battery cells and their support structures 402 from each other in order to prevent shorting. Each the group of ten cylindrical battery cells thereby constitutes a building element of a cassette stack 102, with a dedicated thermal path from each group of battery cells to the bottom cover 202 or top cover 302 via an electrical insulator.

While further details will be provided below regarding the mounting of cylindrical battery cells to the support structure 402, it should be noted that a first set of five battery cells are mounted to the top half of the support structure 402 in a first alignment. In this first alignment, the respective vents of each of these five battery cells are located at an upper end of the support structure 402, so that the vents would discharge in an upward direction and away from a second set of five battery cells that are mounted to the bottom of the support structure 402. Similarly, the second set of five battery cells are mounted to the bottom half of the support structure 402 in a second alignment with the respective vents of each of these five battery cells being located at a lower end of the support structure 402, so that the vents would discharge in a downward direction and away from the first set of five battery cells.

A support structure 402, incorporating a pair of heat pipes 406, is effective to maintain an operational temperature difference between the first set of battery cells, mounted on the top half of the support structure 402, and the second set of battery cells, mounted on the bottom half of the support structure 402 and closest to a heatsink, within a specific tolerance. Accordingly, the described arrangement is effective in addressing a geometric disadvantage of a top-mounted battery cell being further away from a heatsink.

Figure 5:
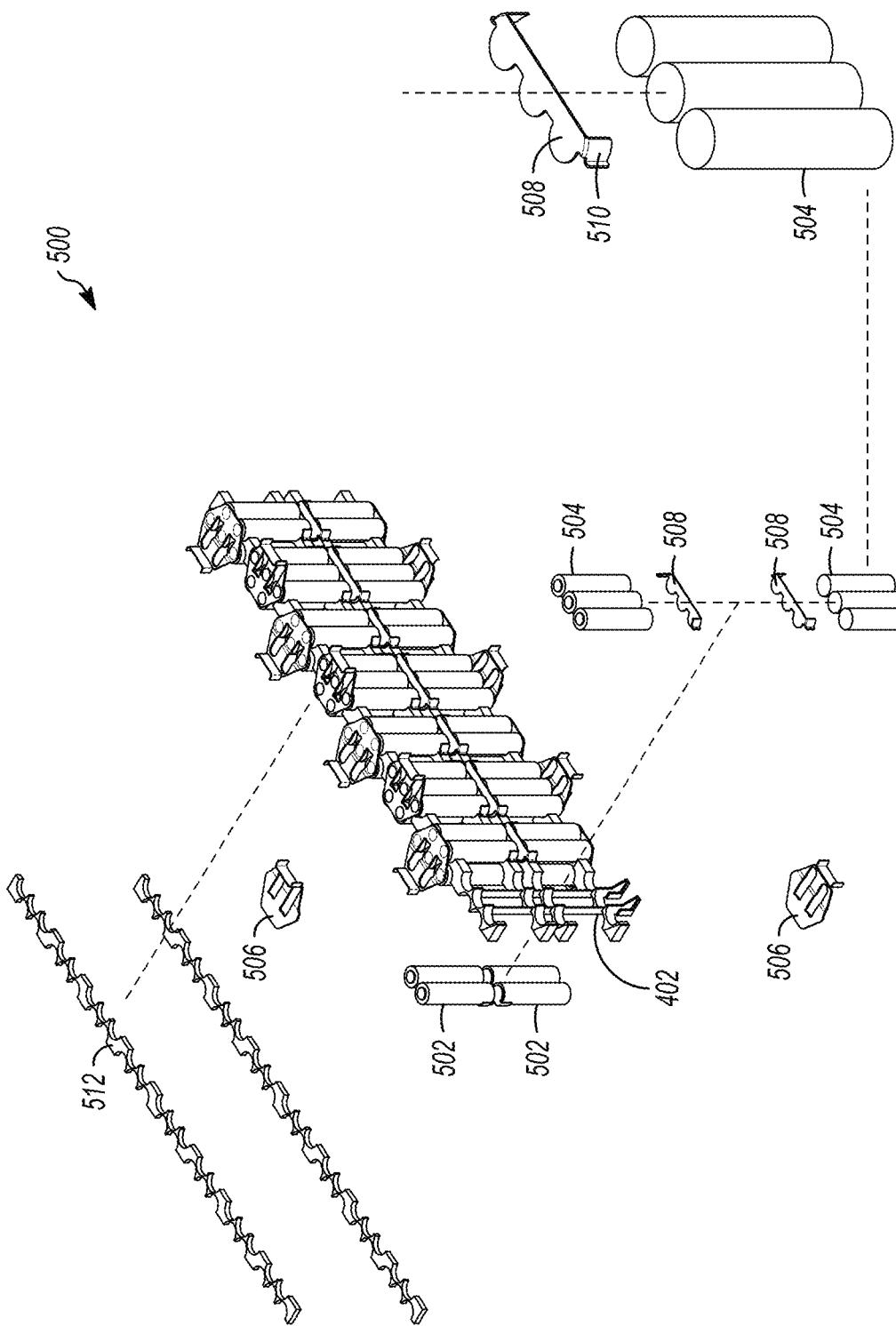
FIG. 5 illustrates a battery cassette in accordance with one example.

FIG. 5 provides exploded perspective views of a battery cassette 500 and specifically how are various components are assembled into a cassette spine 400 shown in FIG. 4

A first battery cell group 502, with each of an upper pair and a lower pair of battery cells being vertically stacked in an opposing orientation, are attached to a first side of a support structure 402. A second battery cell group 504, with each of an upper three and a low three battery cells being vertically stacked in opposing directions, are attached to a second side of the support structure 402. Specifically, each of the battery cell group 502 and battery cell group 504 are bonded to a respective support structure 402 by a thermally conductive epoxy, so as to thermally couple the battery cells to the support structure 402 so that the support structure 402 can operationally conduct thermal energy to a heatsink.

A top cell interconnect 506 is welded to the top ends (positive) of the upper five cylindrical battery cells, and also to the lower ends (also positive) of the lower five cylindrical battery cells. Similarly, a bottom cell interconnect 508 is welded to the negative ends of each of the battery cell group 502 and battery cell group 504. Each bottom cell interconnect 508 has a pair of wings 510 that depend therefrom along the side of the battery cell group 504 and which, when the relevant set of three battery cells is inserted into a support structure 402, are in electrical contact (e.g., through an electrically conductive weld) with the support structure 402. Accordingly, each support structure 402 is electrically coupled to the negative terminals of a group of ten battery cells that are mounted to the support structure 402, which effectively becomes a negative terminal for all of the ten cells mounted thereto.

Each top cell interconnect 506 and bottom cell interconnect 508 is constructed from aluminum and stamped to create a laminated bus between the respective positive or negative ends of a group of cells, upon assembly into the cassette spine 400.

Further a gap filler 512, comprising a plastic injection molded part, is inserted around and along the portion of each battery cell group 502, 504 adjacent to the positive ends of the cells of the battery group. The cell vents are located at the positive ends of the cells, so that if a cell vents then the gap filler prevents vent gas from flowing back into the cell matrix (e.g. in the direction of the negative terminals).

Figure 6:
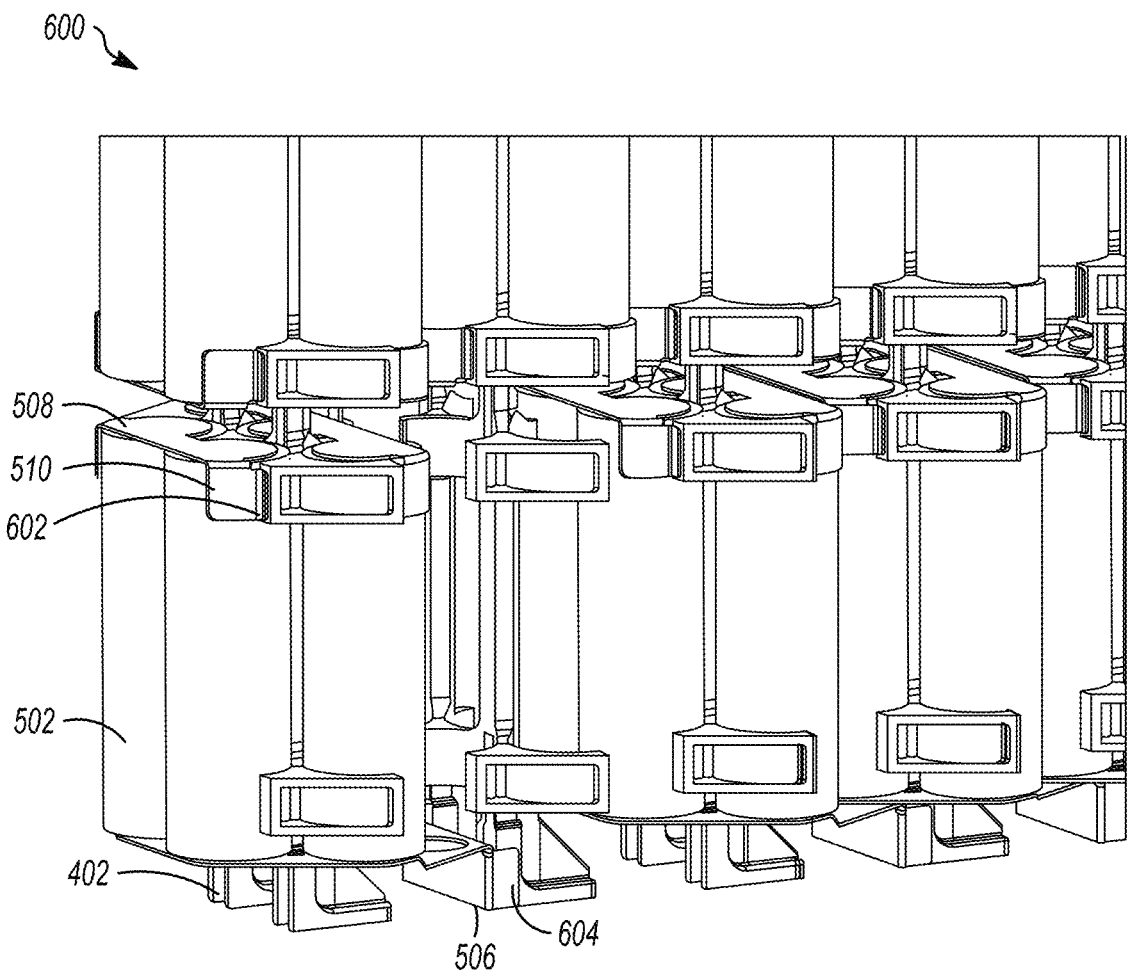
FIG. 6 illustrates a battery cell interconnect arrangement in accordance with one example.

FIG. 6 is a perspective diagram, illustrating further details regarding the cell interconnects, such as the top cell interconnect 506 and bottom cell interconnect 508, in a battery cell interconnect arrangement 600. FIG. 6 more clearly illustrates how a planar section of a bottom cell interconnect 508 is welded to the bottom (negative) ends of each 2 cell battery cell group 502 and the wings 510 of each bottom cell interconnect 508 are welded to a support structure 402 at location 602. It will be appreciated that, upon assembly, the top cell interconnect 506 and bottom cell interconnect 508 form part of the support structure 402 regardless of whether or not they are first attached to a battery terminal before being attached to the support structure 402.

Also shown is how a top cell interconnect 506 is welded to the top (positive) ends of a group of five upper (or lower) mounted battery cells, and to the foot of a neighboring support structure 402 at location 604. In this way, the positive terminals of a group of five mounted battery cells are electrically coupled in parallel to a negative terminal, in the form of the support structure 402 itself, of a neighboring cell group.

Similarly, although not shown in FIG. 6, the positive terminals of a group of five upper-mounted battery cells is coupled in series with a negative terminal (e.g., the support structure 402 itself) of a neighboring cell group. Accordingly, the top cell interconnect 506 facilitates connections between neighboring cell groups.

Known cell arrangements typically provide exposure of both the positive and negative terminals of any cluster or group of batteries, so as to allow interconnection between terminals of respective clusters. The current example is advantageous in that it avoids a constraint of having both the negative and positive terminals of every cluster being exposed, by electrically coupling the negative terminals to a supporting support structure 402, and extending the positive terminals of a first and second clusters or groups of cylindrical cells from one side of an assembly and into contact with the support structure 402 of a neighboring assembly.

Figure 7:
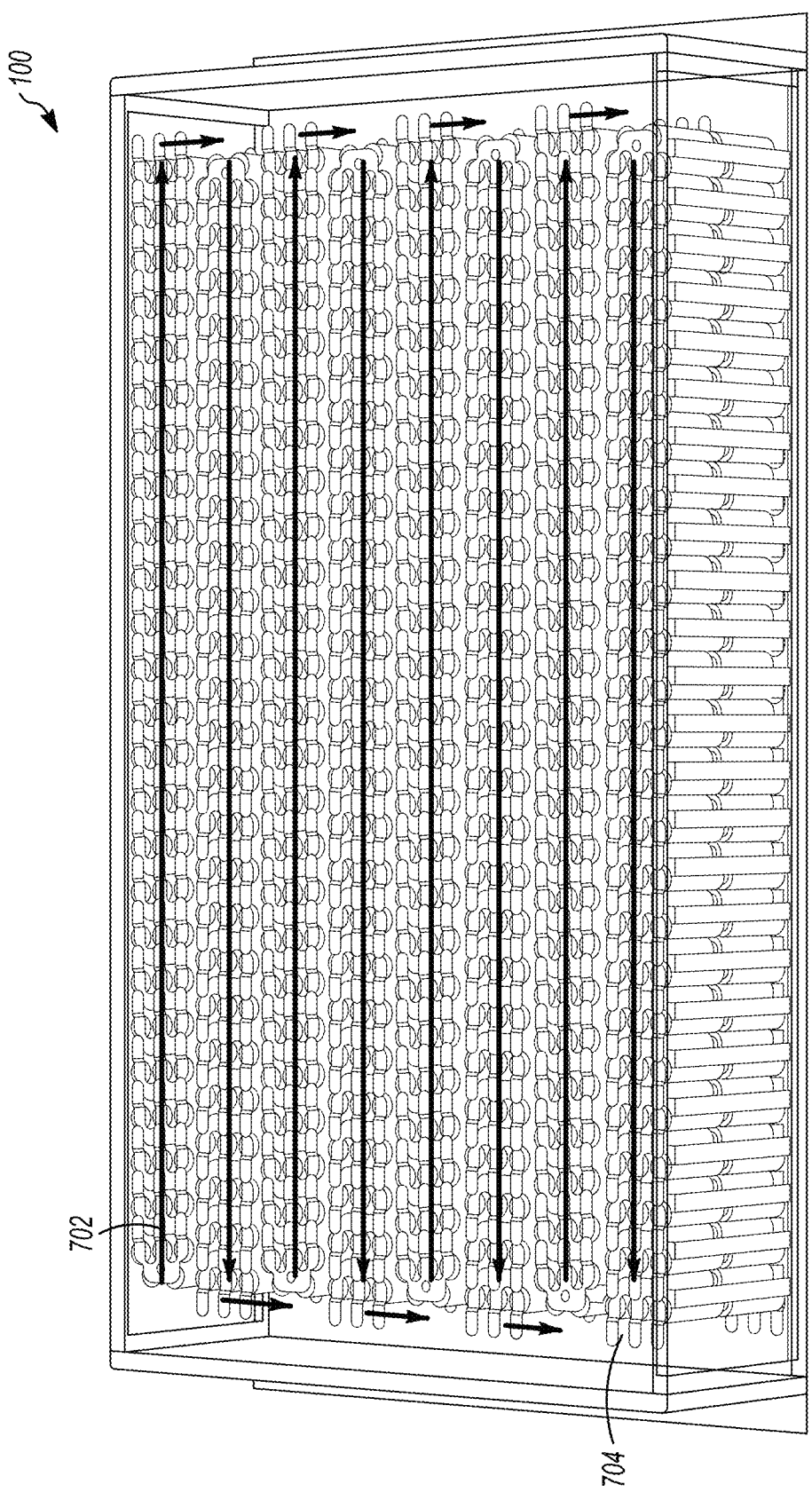
FIG. 7 illustrates aspects of a battery pack in accordance with one example.

FIG. 7 is a perspective illustration of a battery pack 100, according to example, and illustrates a connection sequence between adjacent assemblies, with the arrow lines indicating a direction of series connection between the assemblies. As can be seen, current flows from a negative terminal 702 of the battery pack 100 from left to right (in the figure), from one battery cassette 304 to the next until it reaches the rightmost battery cassette 304. An electrical interconnect then passes the current down (in the figure) to the next group of cells in the rightmost battery cassette 304.

The current then flows in the opposite direction in the same manner as before, and this process repeats with the current passing back and forth and downward (in the figure) until the current reaches the positive terminal 704.

Figure 8:
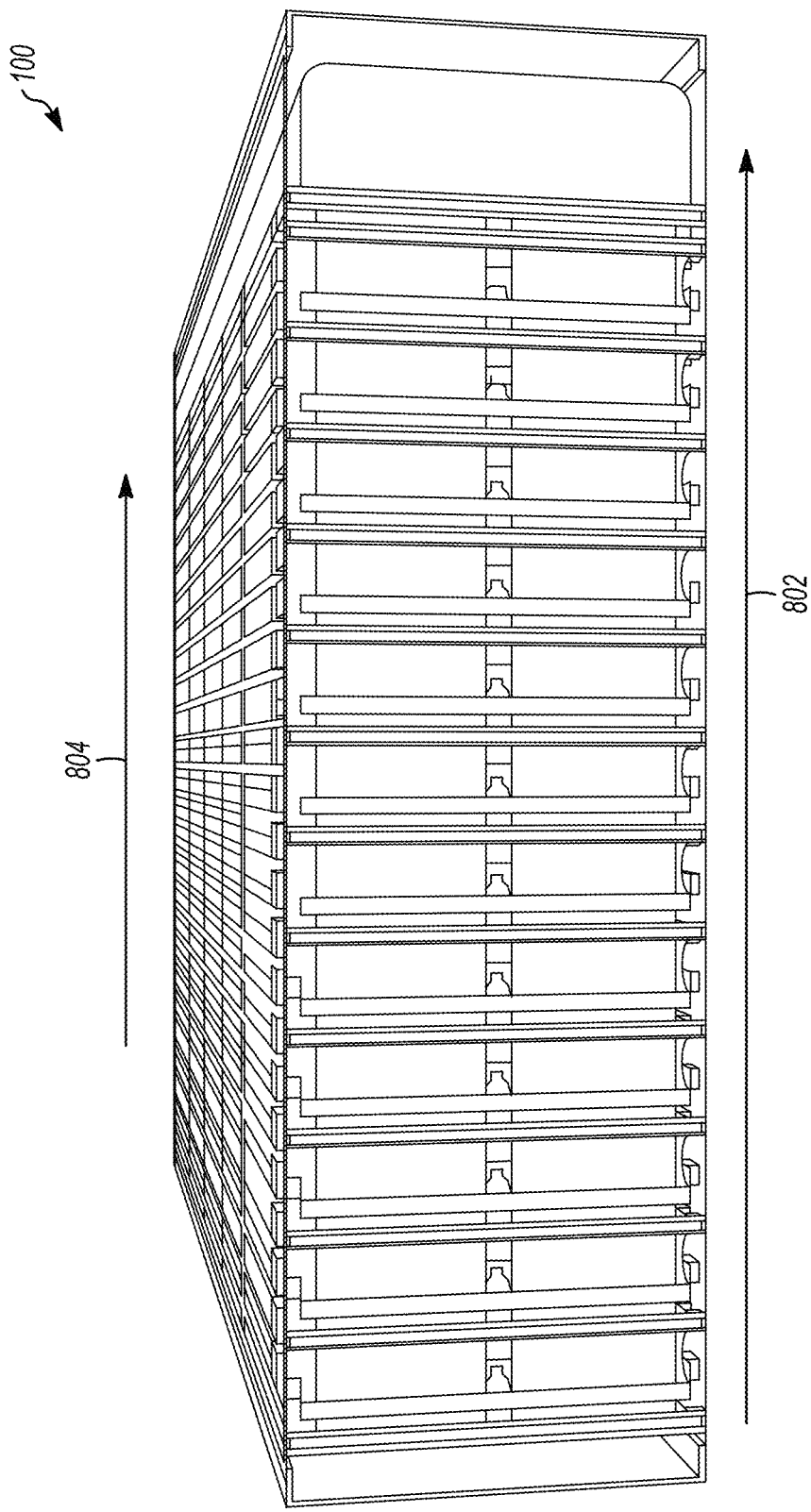
FIG. 8 illustrates aspects of a battery pack in accordance with one example.

FIG. 8 is a perspective diagram of a battery pack 100, specifically illustrating free airflow 802 under the bottom cover 202 of the battery pack 100, or under a fuselage with which the bottom cover 202 of the battery pack 100 is in thermal contact. Also, when an aerial vehicle is docked at a base (e.g., Skyport), a conductive cooling pad or other active cooling mechanism may be brought into thermal contact with the bottom cover 202 of the battery pack 100 in order to extract thermal energy.

In a further example, ducted airflow 804 may also be provided, within the fuselage of an aerial vehicle, over the top of the battery pack 100 in order to provide further cooling.

Figure 9:
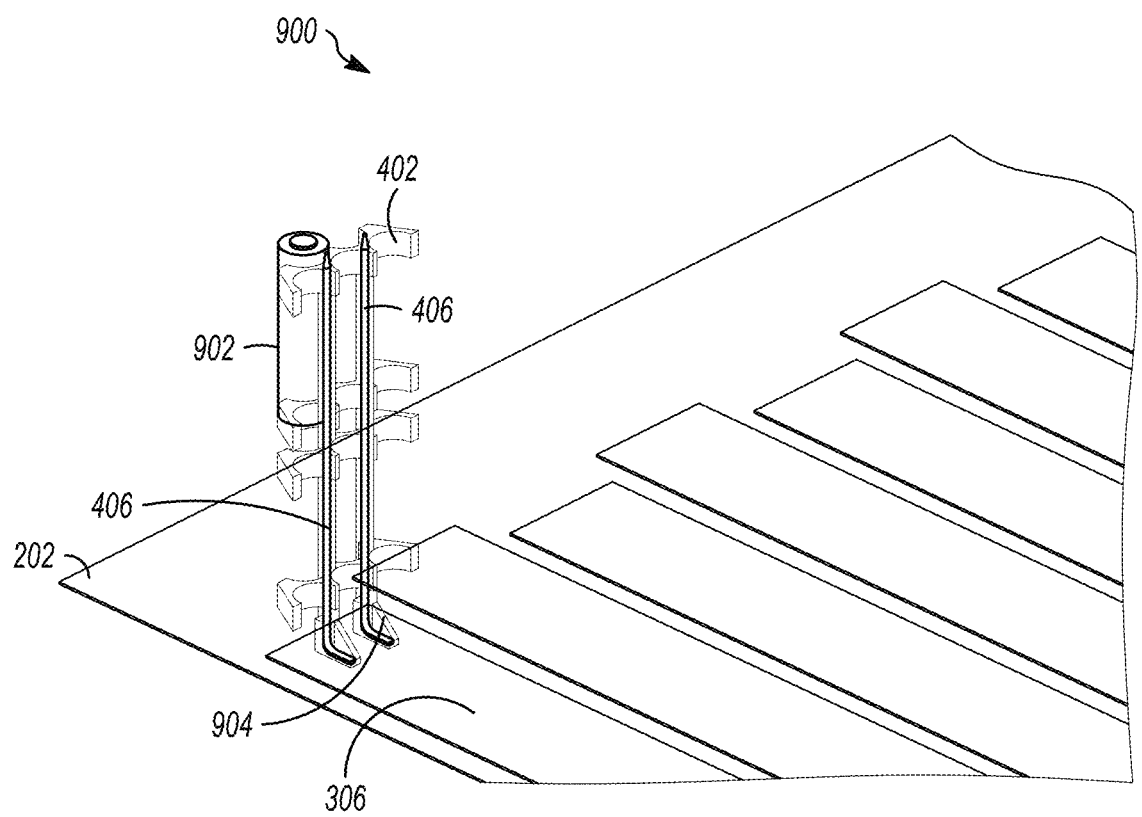
FIG. 9 illustrates a heat pipe configuration in accordance with one example.

FIG. 9 is a perspective diagram, showing further details of a heat pipe configuration 900. In particular, FIG. 9 shows the thermal coupling between a support structure 402, including heat pipes 406, and a strip of electrical insulator 306 that is thermally conductive and coupled to a bottom cover 202 of a battery pack 100. The support structure 402 is shown to provide a thermal path from a battery cell 902 via a pair of heat pipes 406. Each heat pipe 406, which is soldered into the support structure 402, has a bent (or L-shaped) foot, as described above, which is coupled, using a thermal interface 904 (e.g., epoxy, gap pad etc.) to the electrical insulator 306, which in turn is thermally coupled to the bottom cover 202 of the battery pack 100. The bottom cover 202 accordingly acts as a heat sink with thermal energy traveling on the thermal path from the battery cell 902, via the heat pipes 406, and through the electrical insulator 306. Each electrical insulator 306 may be constructed using a ceramic foil or a polymer which is thermally conductive, but electrically insulative so as to prevent shorting between support structures 402, as these are at potential.

Figure 10:
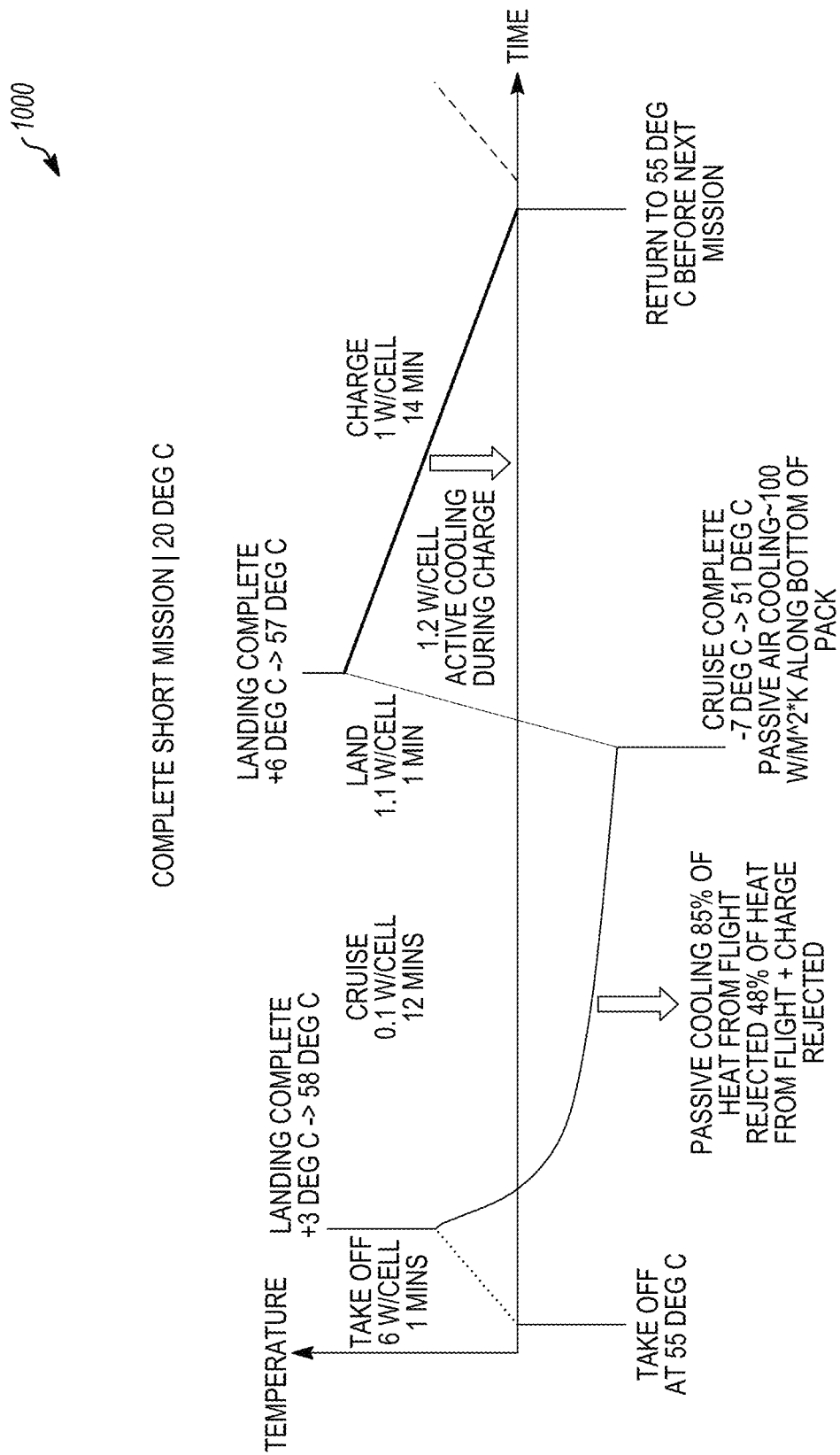
FIG. 10 illustrates a battery pack temperature graph in accordance with one example.

FIG. 10 shows a temperature graph 1000, illustrating the effect of passive cooling as a result of airflow over a heat sink (e.g., bottom cover 202), described above, and active cooling, described below, through various operational states of the aerial vehicle 3600.

As can be seen from the temperature graph 1000, the battery pack 100 may for example be at a temperature of 55 deg C. at takeoff. During vertical takeoff, the temperature of the battery pack 100 may rise by for example 3 deg due to the relative lack of free airflow 802 and ducted airflow 804 over the battery pack 100 during takeoff. Once takeoff is complete, the aerial vehicle 3600 transitions to horizontal flight and the temperature of the battery pack 100 decreases by for example 7 deg as a result of passive cooling due to free airflow 802 and ducted airflow 804. When the flight is complete, the aerial vehicle 3600 transitions to vertical flight for landing and the temperature of the battery pack 100 may rise by for example 6 deg due to the relative lack of free airflow 802 and ducted airflow 804 over the battery pack 100 during landing. After landing, the battery pack 100 may be actively cooled and charged, to return the battery pack 100 to an appropriate temperature and state of charge in preparation for the next flight.

Figure 11A:
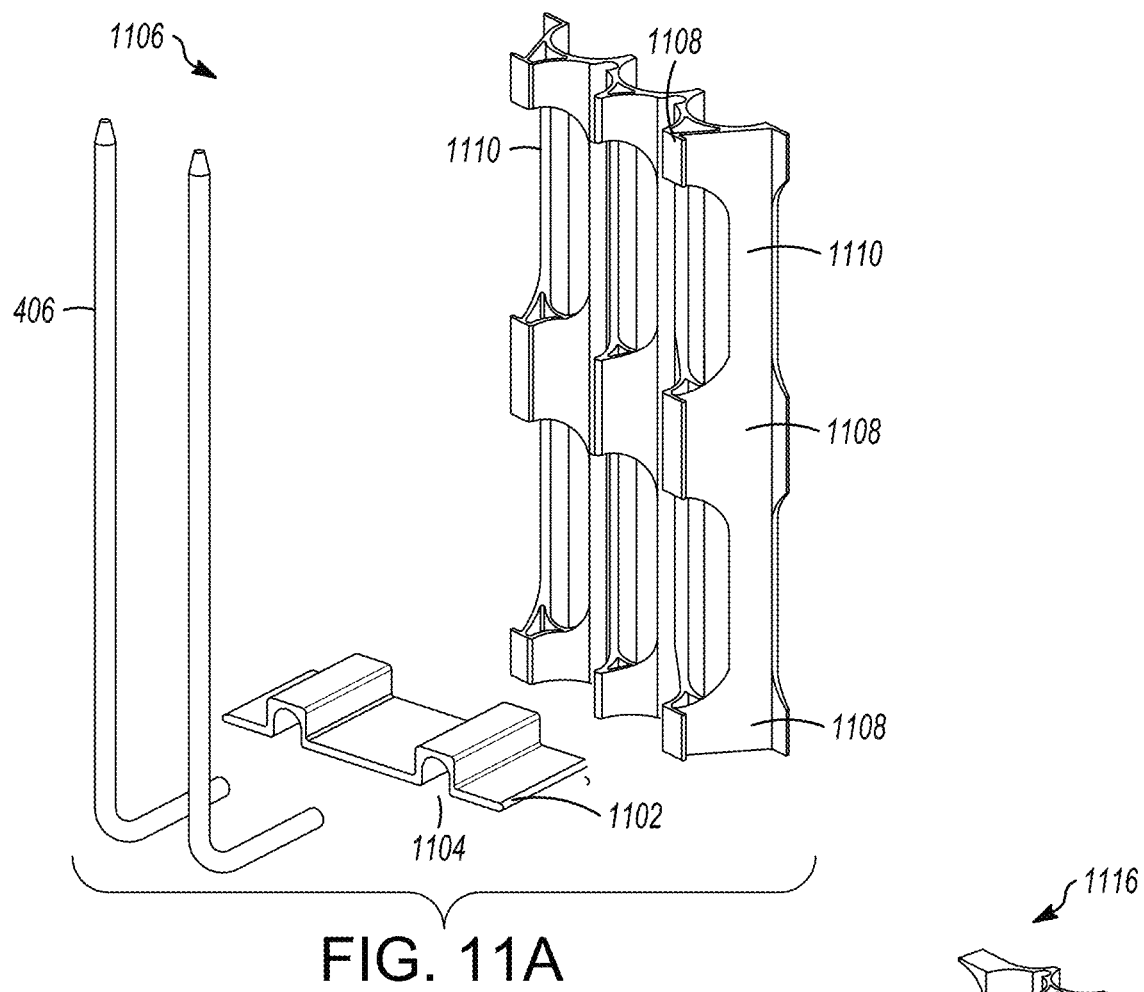
FIG. 11A illustrates a support structure in accordance with one example.
Figure 11B:
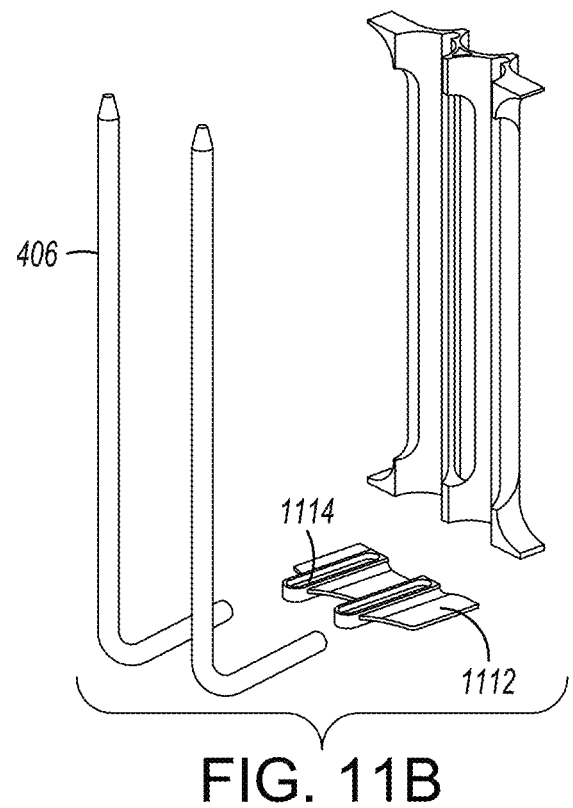
FIG. 11B illustrates a support structure in accordance with one example.

FIG. 11A and FIG. 11B illustrate two alternative examples of a support structure.

As shown in FIG. 11A, provided is a separate foot 1102, which is an aluminum extrusion that defines two downwardly facing channels 1104 that are sized to receive the lower ends of the heat pipes 406. The heat pipes 406 are bonded into the support structure 1106 and the foot 1102 with thermally conductive epoxy.

It can also be seen that the frame of support structure 1106 of FIG. 11A has three cross members 1108 supported by four vertical members 410. The support structure 1106 includes three semicircular recesses on one side to accommodate a group of three cell batteries, and two recesses on the other side to accommodate a group of two cell batteries. In an example, a single support structure 1106 is able to accommodate and hold ten cylindrical battery cells, five at the bottom and five at the top, as before. Each support structure 1106 is constructed of a material that is both a good thermal and electrical conductor, (e.g. aluminum or some other metal).

As shown in FIG. 11B, also provided is an alternative example of a support structure 1116 with a separate foot 1112 made of extruded aluminum, which has two upwardly facing slots 1114 defined therein that are sized to receive the lower ends of the heat pipes 406. The heat pipes 406 are bonded into support structure 1106 and the foot 1112 with thermally conductive epoxy. The foot 1112 may be anodized with type III anodization so that the heat pipes 406 are electrically insulated from the surface (e.g. bottom cover 202) to which the foot is mounted. The frame of support structure 1116 shown in FIG. 11B is a machined aluminum extrusion, in which mass has been reduced by eliminating two of the vertical members 1110 and the central cross member 1108 of the frame of support structure 1106 of FIG. 11A.

While the support structure illustrated in FIG. 11A and FIG. 11B are shown as comprising three separate parts that are assembled together, it will be appreciated that the support structure may be formed as a single unitary item or one or more parts of the support structure may be combined into a single unitary structure.

Figure 12:
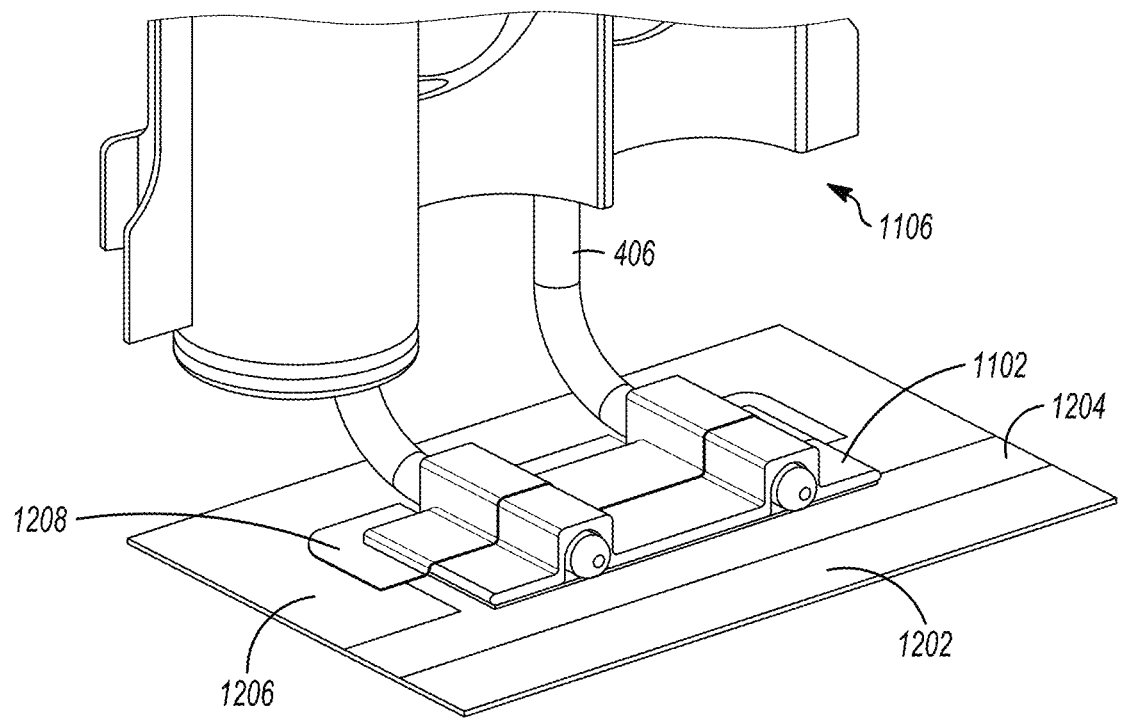
FIG. 12 illustrates a cut away perspective view of a foot mounted to a bottom cover in accordance with one example.

FIG. 12 is a cut away perspective view of a foot 1102 mounted to a bottom cover 1202 in accordance with one example. In this example, the bottom cover 1202 is a solid titanium plate. There is a Kapton insulation layer 1204 located between the bottom cover 1202 and the foot 1102, which serves to electrically insulate the foot 1102 (and thus the support structure 1106) from the bottom cover 1202. A layer of thermal insulation 1206 is provided above the Kapton insulation layer 1204 and around each foot 1102. A layer of thermal insulation 1208 is provided over each foot as shown. The thermal insulation 1206 and the thermal insulation 1208 direct heat away from the cassette stack 102 and to the exterior of the battery pack 100. FIG. 12 shows the various layers cut away for clarity. It will be appreciated that the various layers extend to provide appropriate coverage in each case.

Figure 13:
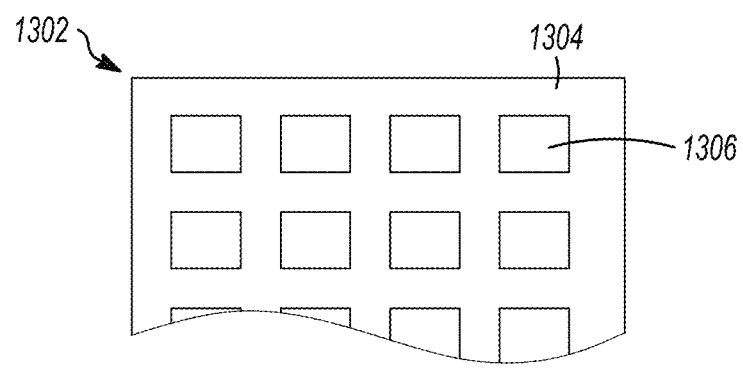
FIG. 13 illustrates a bottom cover for a battery pack in accordance with one example.

FIG. 13 illustrates a bottom cover 1302 in accordance with one example. As shown in the figure, the bottom cover 1302 may be formed as an electrically insulating baseplate 1304 having thermally conductive pucks 1306 embedded therein. The pucks 1306 are exposed to the exterior and provide a conductive path to the outside for the heat generated by the cassette stack 102. The mounting of a foot 1102 to a puck 1306 and the arrangement of insulation layers is the same as is shown and described with reference to FIG. 12.

The pucks 1306 may be made of any material having a high thermal conductivity, which is likely to be a metal and preferably a lightweight one, e.g. titanium, aluminum etc. The baseplate 1304 can be any suitable electrically insulating material (e.g. basalt composite, thermoplastic, etc.). The bottom cover 1302 provides a thermal path to the outside via the pucks 1306 but also has the benefit that the non-electrical conductive property of the baseplate 1304 acts as additional (and the most exterior) electrical isolation between the support structures 1106.

Figure 14:
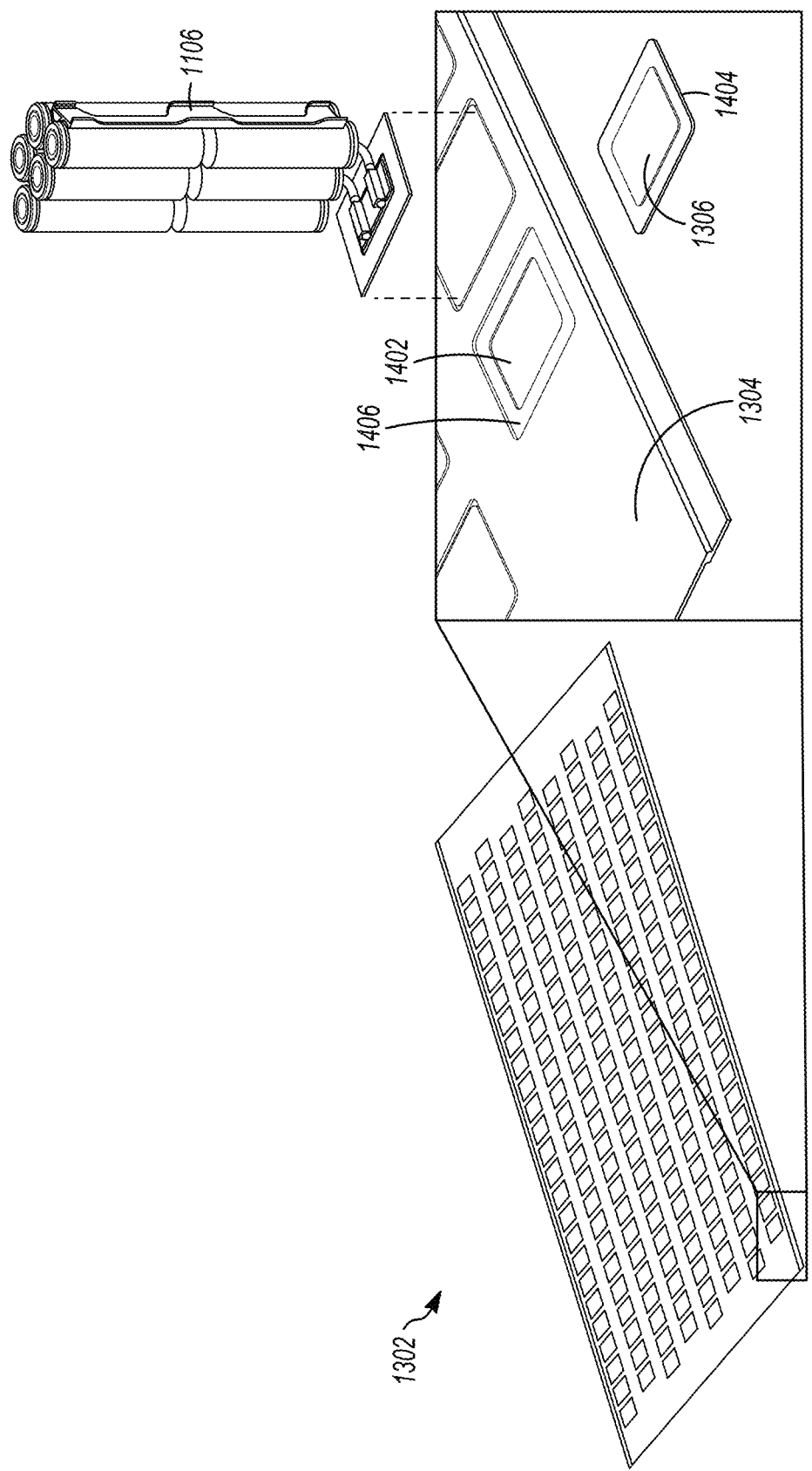
FIG. 14 illustrates the bottom cover of FIG. 13 in more detail.

FIG. 14 illustrates the bottom cover 1302 of FIG. 13 in more detail. As can be seen, the baseplate 1304 has a plurality of apertures 1402 defined therein, each having a stepped perimeter 1406 as shown. Each puck 1306 (one shown inverted in FIG. 14) has a corresponding stepped perimeter 1404 that engages with the perimeter 1406 defining the aperture 1402, thereby to help position and secure the pucks 1306 when they are bonded in place in the bottom cover 1302.

Figure 15:
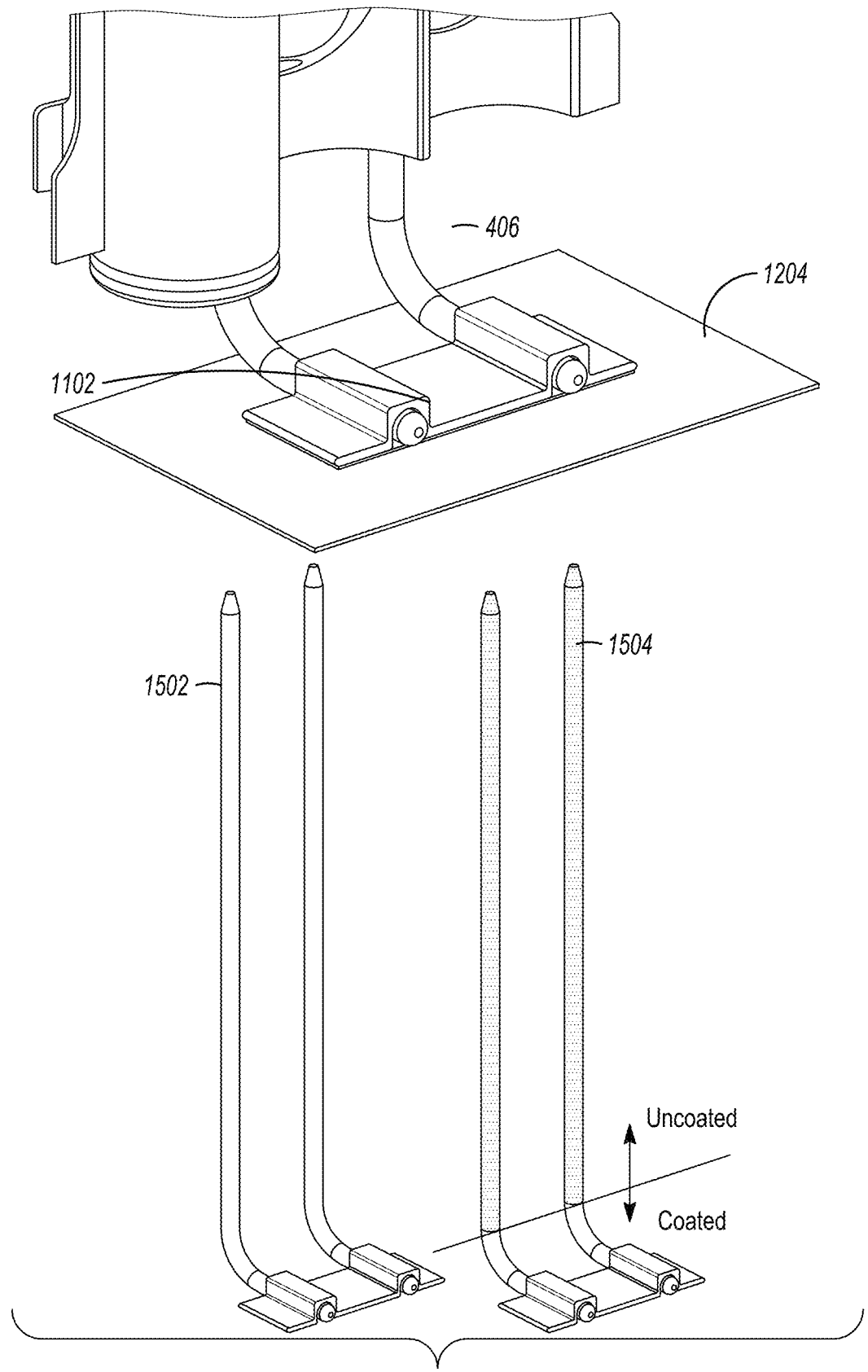
FIG. 15 illustrates a perspective view of a foot mounted to a bottom cover in accordance with another example.

FIG. 15 illustrates a perspective view of a foot 1102 mounted to a bottom cover 1202 in an alternative example. In this example, the foot 1102 and at least part of the heat pipes 406 are powder coated to provide an additional layer of electrical insulation. The heat pipes 406 are assembled to the foot before powder coating. In one example, the entire subassembly 1502 of heat pipes 406 and foot 1102 may be powder coated. In another example, as shown for subassembly 1504, the upper portion is masked prior to powder coating so that only the bottom portion is coated.

It will be appreciated that various combinations of the mounting arrangements described above with reference to FIG. 12, FIG. 13 and FIG. 15 are possible. For example, the thermal insulation 1206 and thermal insulation 1208 of FIG. 12 could also be provided in the example shown in FIG. 15.

Figure 16:
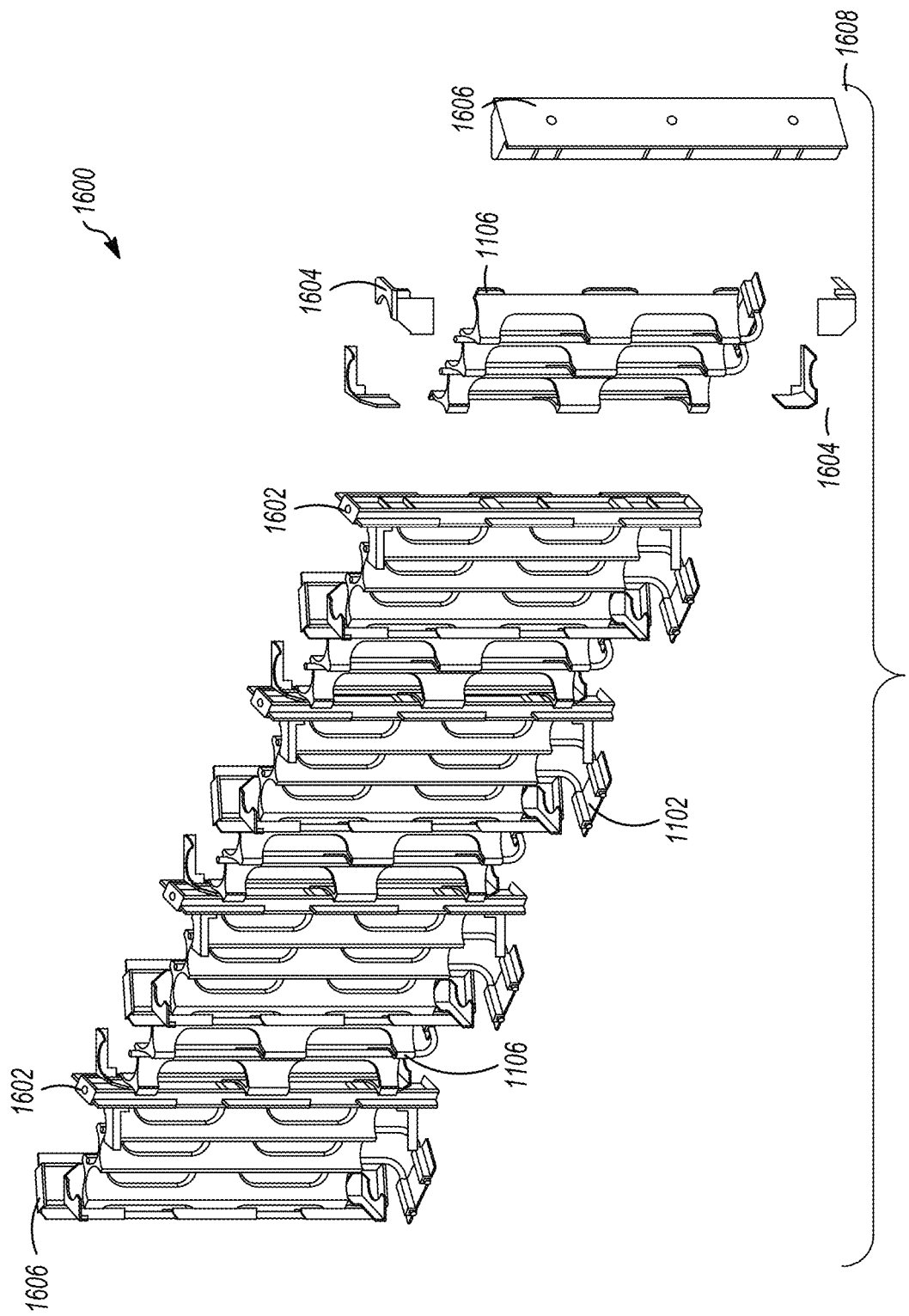
FIG. 16 illustrates exploded perspective views of a cassette spine in accordance with one example.

FIG. 16 provides exploded perspective views of a cassette spine 1600, according to example alternative examples, which is constructed from a series of connected or bridged support structures 1106.

The arrangement of support structures 1106, when assembled to form the cassette spine 1600, provides a cassette-based architecture for the battery pack 100, with a series of support structures 1106 each accommodating ten cylindrical battery cells to form cassette-based subassemblies (e.g. a battery cassette 304).

As will be described in further detail with respect to a subsequent figure, all five cells in an upper or lower group of five battery cells of the ten that are mounted to a single support structure 1106 are connected in parallel, so that the fives cells are all at the same electrical potential. This allows a group of ten mounted battery cells to be conveniently connected as discussed in more detail below.

As shown in more detail in FIG. 11A, each support structure 1106 includes a foot 1102 to facilitate thermal coupling to the bottom cover 1202. The two middle vertical members 1110 also each include a longitudinally extending hollow chamber, into which the heat pipes 406 are soldered or bonded.

Also provided in this example are aluminum ears 1604 that are welded to the support structures 1106 to form part of the electrical connection between the adjacent groups of battery cells as will be discussed in more detail below.

In order to construct the cassette spine 1600, multiple support structures 1106 are connected to each other using bridges 1602, which are shaped to receive the sides of adjacent support structures 1106. The bridges 1602 are bonded to the support structures 1106 in order to physically couple, but electrically insulate, support structures 1106 from each other. In order to provide the electrical insulation, a bridge 1602 is made of an electrically insulating material, such as an injection molded plastic. A series of eight support structures 1106 may be connected in alternating orientations to form the cassette spine 1600. End caps 1606, made of the same material as the bridges 1602, are shaped for engagement with the final support structure 1106 and are angled relative to the support structures 1106 to provide an exterior attachment surface 1608 at each end of the cassette spine 1600 that is parallel to the cross structures 110.

The bridges 1602 thus serve to electrically insulate the mounted battery cells and their support structures 1106 from each other in order to prevent shorting. Each the group of ten cylindrical battery cells thereby constitutes a building element of a battery cassette 304, which in turn constitutes a building block of a cassette stack 102, with a dedicated thermal path from each group of battery cells to the bottom cover 202.

As with the examples of FIG. 5 and FIG. 6, a first set of five battery cells are mounted to the top half of the support structure 1106 in a first alignment. In this first alignment, the respective vents of each of these five battery cells are located at an upper end of the support structure 1106, so that the vents would discharge in an upward direction and away from the second set of five battery cells that are mounted to the bottom of the support structure 1106. Similarly, the second set of five battery cells are mounted to the bottom half of the support structure 1106 in a second alignment with the respective vents of each of these five battery cells being located at a lower end of the support structure 402, so that the vents would discharge in a downward direction and away from the first set of five battery cells.

The assembled cassette spine 1600 serves a number of purposes. Firstly, it provides a support structure to which battery cells can be mounted. Secondly, it provides a thermal path, via support structures 1106, that collects and directs heat away from the cells. Thirdly, it provides an electrically conductive path, via support structure 1106, along which current can flow through the battery pack 100 as will be described further below. Finally, the cassette spine 1600 is also a structural element that transfers gravitational or g-force loads experienced by the battery cells to the cross structures 110.

Figure 17:
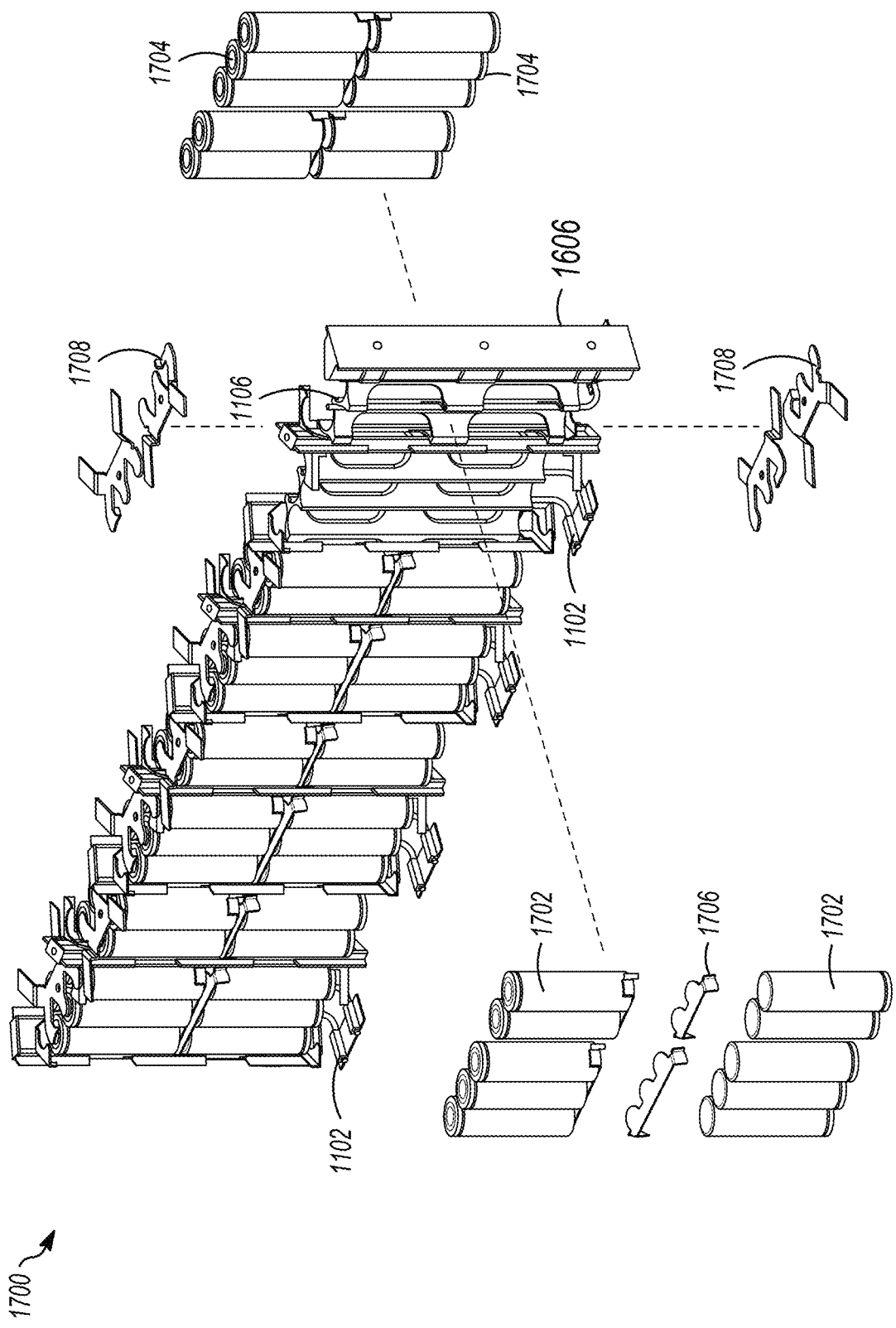
FIG. 17 illustrates an exploded perspective view of a battery cassette in accordance with one example.

FIG. 17 provides an exploded perspective view of a battery cassette 1700 and shows specifically how the various components are assembled into the cassette spine 1600 shown in FIG. 16.

A first battery cell group 1702, with each of an upper pair and a lower pair battery cells being vertically stacked in an opposing orientation, are attached to a first side of a support structure 1106 forming part of a cassette spine 1600. A second battery cell group 1704, with each of an upper three and a low three battery cells being vertically stacked in opposing directions, are attached to a second side of the support structure 1106. Specifically, each of the battery cell group 1702 and battery cell group 1704 are bonded to a respective support structure 1106 by a thermally conductive epoxy, so as to thermally couple the battery cells to the support structure 1106 and so that the support structure 1106 can operationally conduct thermal energy to a heatsink.

A bottom cell interconnect 1706 is welded to the negative terminals of each of the battery cell group 1702 and battery cell group 1704 prior to the assembly of each battery group to the cassette spine 1600. Each bottom cell interconnect 1706 has a pair of wings that depend therefrom along the side of the battery cell group and which, when the relevant set of battery cells is inserted into a support structure 1106, are in electrical contact (e.g., through an electrically conductive weld) with the support structure 1106. Accordingly, each support structure 1106 is electrically coupled to the negative terminals of a group of ten battery cells that are mounted to the support structure 1106, which effectively becomes a negative terminal for all of the ten cells mounted thereto. After assembly of battery cell group 1702 and battery cell group 1704 to the cassette spine 1600, a top cell interconnect 506 is welded to the top ends (positive terminals) of the upper five cylindrical battery cells, and also to the lower ends (also the positive terminals) of the lower five cylindrical battery cells.

Each bottom cell interconnect 1706 and top cell interconnect 1708 is constructed from aluminum and stamped to create a laminated bus between the respective positive ends of a groups of ten cells in one cassette spine 1600 and the negative terminals of a group of ten cells in an adjacent battery cassette 1700 (via the support structure 1106 and its ears 1604) upon insertion of the battery cassettes 1700 into a cassette stack 102.

It should be noted that each group of ten cells attached to a support structure 1106 in one battery cassette 1700 faces in the opposite direction to any adjacent groups of ten cells attached to an adjacent support structure 1106 in the same battery cassette 1700, due to adjacent support structures being assembled in opposite directions. This can clearly be seen since only four of the eight feet 1102 in the battery cassette 1700 are visible in FIG. 17. This allows for compact packaging since the numbers of cells along one upper or lower side of the 1400 alternate in number (e.g. 2-3-2-3-2-3-2-3) but more importantly, this arrangement means that, when battery cassettes 1700 are assembled into a battery cassettes 304, current can flow between groups of cells in adjacent battery cassettes 1700 in alternating directions as shown in more detail in FIG. 22.

Figure 18:
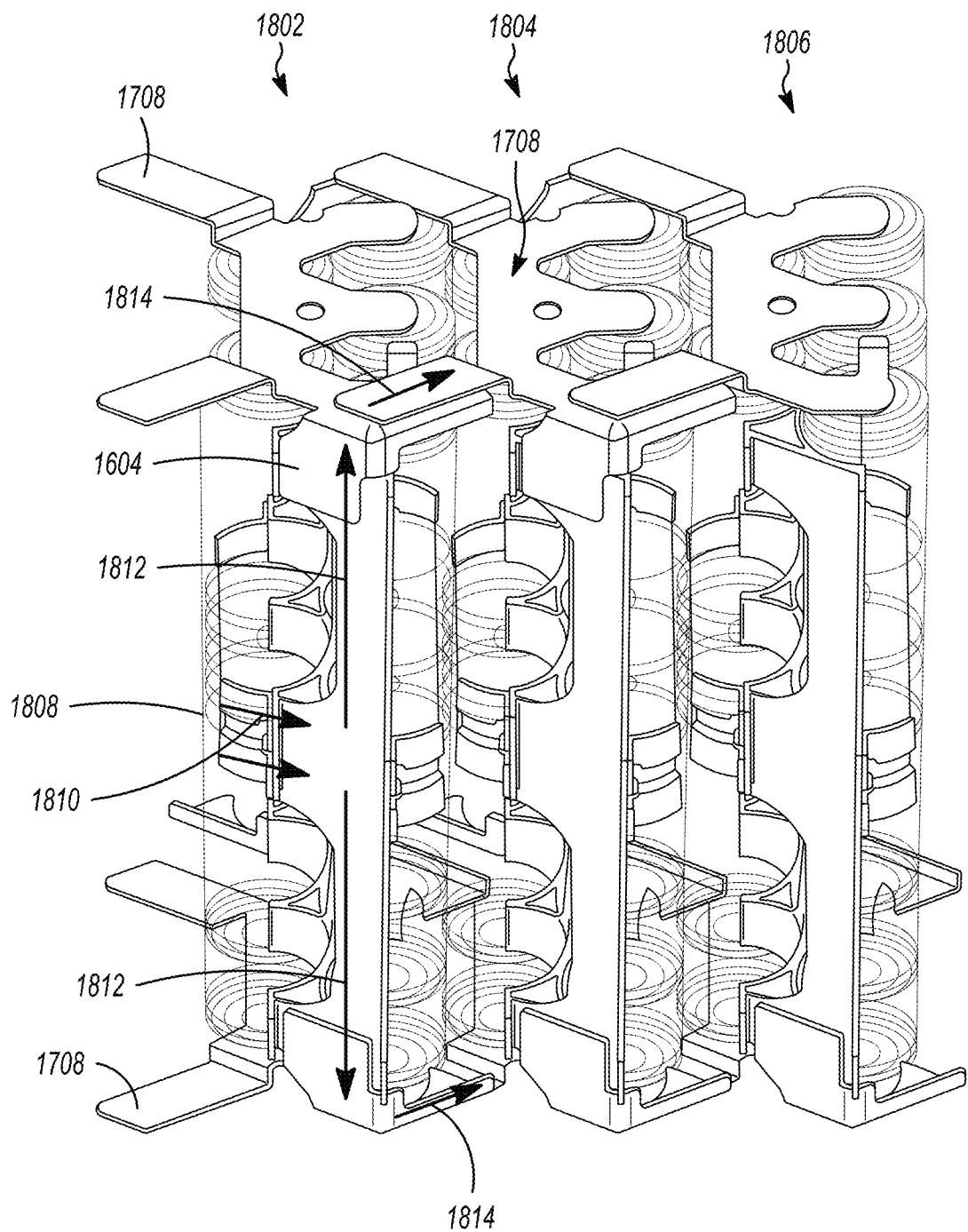
FIG. 18 is a perspective view illustrating the electrical interconnections between battery groups in three adjacent battery cassettes in accordance with one example.

FIG. 18 is a perspective diagram illustrating the electrical interconnections between battery groups in three adjacent battery cassettes 1700. Illustrated are three groups of battery cells, group one 1802, group two 1804 and group three 1806. As can be seen and referring to FIG. 17, current flows from the negative terminals 1808 of the cells in group one 1802, through the bottom cell interconnects 1706 (see FIG. 17) into the support structure 1106 as shown by arrows 1810. The current then flows in either direction to ears 1604 as shown by arrows 1812. From each ear 1604, current flows to the corresponding top cell interconnect 1708 of group two 1804 as shown by arrows 1814. The current then enters the positive terminals of the cells in group two 1804. After passing through the cells in group two 1804, the current then leaves the negative terminals of the cells in group two 1804 where it passes though the group two bottom cell interconnects 1706, support structure 1106 (via ears 1604) and on to the group three top cell interconnects 1708, and so on.

Known cell arrangements typically provide exposure of both the positive and negative terminals of any cluster or group of batteries, so as to allow interconnection between terminals of respective clusters. The current example is advantageous in that it avoids a constraint of having both the negative and positive terminals of every cluster being exposed, by electrically coupling the negative terminal to a supporting support structure 1106, and extending the positive terminals of a first group of cylindrical cells from one side of a battery cassette 1700 and into contact with the support structure 1106 of a group of cells in a neighboring battery cassette 1700.

Figure 19:
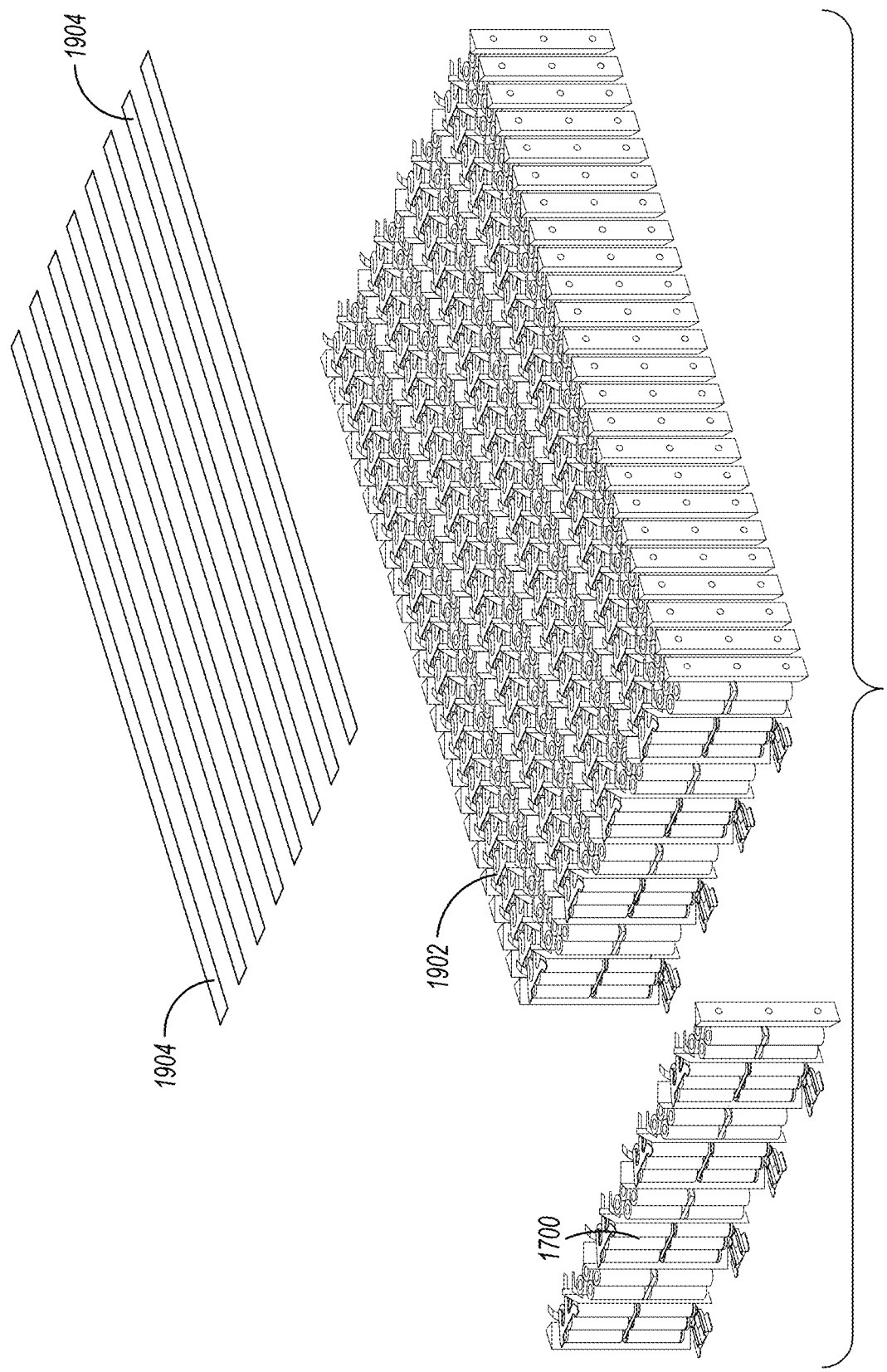
FIG. 19 illustrates an exploded perspective view of a plurality of battery cassettes showing how they are arranged to form a cassette stack accordance with one example.

FIG. 19 is an exploded perspective view of a plurality of battery cassettes 1700 showing how they are arranged side by side to form a cassette stack 1902 in the configuration found in the battery pack. Also shown in the example of FIG. 19 are cell monitoring modules 1904 in the form of flexible PCB strips that monitor cell temperatures and voltages. Each cell monitoring module 1904 includes temperature sensors at intervals as well as electrical connections to some or all of the top cell interconnects 1708 along the upper surface of the battery groups, e.g. group one 1802. The cell monitoring modules 1904 are connected to the battery management system (BMS) module 104 so that it can continuously monitor the state of the battery and take appropriate action in the event that a temperature or voltage problem is detected. The cell monitoring modules 1904 also facilitate battery balancing (during charging) of the attached cell groups via discharge resistors that are thermally coupled to the top cell interconnects 1708.

Figure 20A:
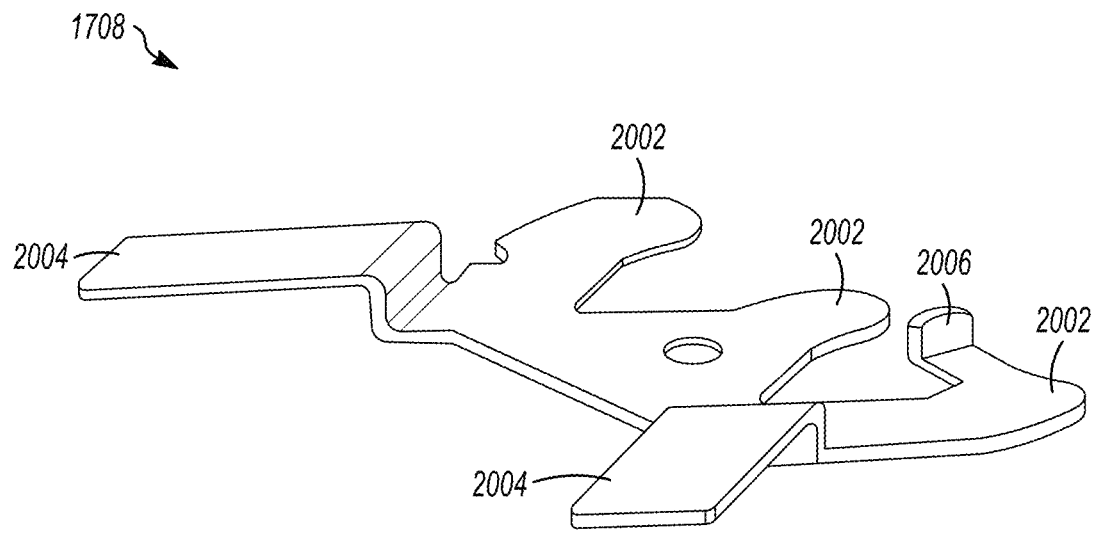
FIG. 20A is a perspective view of a top cell interconnect in one example.

FIG. 20A is a perspective view of a top cell interconnect 1708. The top cell interconnect 1708 includes three terminals 2002 that are welded in use to the positive terminals of the upper set of battery cell group 1704 and two legs 2004 that in use reach back to connect to ears 1604 (see FIG. 16). The top cell interconnect 1708 also includes a tab 2006 that extends upwardly therefrom.

Figure 20B:
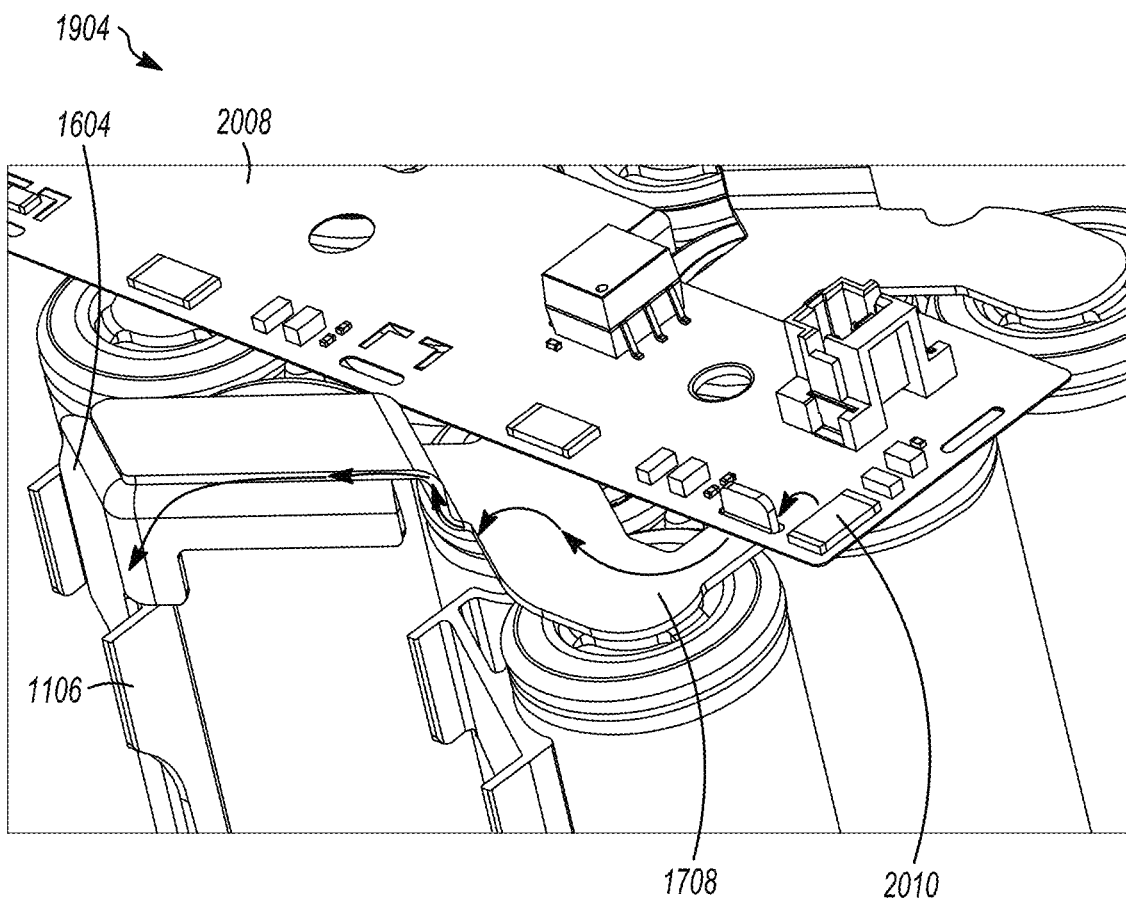
FIG. 20B is a partial perspective view of a cell monitoring module in accordance with one example.

FIG. 20B is a partial perspective view of the cell monitoring module 1904, showing its relationship to a top cell interconnect 1708. The cell monitoring module 1904 includes a PCB 2008 and a plurality of electrical components including a balancing discharge resistor 2010. The tab 2006 of the top cell interconnect 1708 is received into a slot in the PCB 2008 adjacent to the resistor 2010. The tab 2006 serves to position the cell monitoring module 1904 as well as to facilitate a thermal path for heat generated by the resistor 2010 to the support structure 1106 via the top cell interconnect 1708 and the ears 1604.

Figure 21:
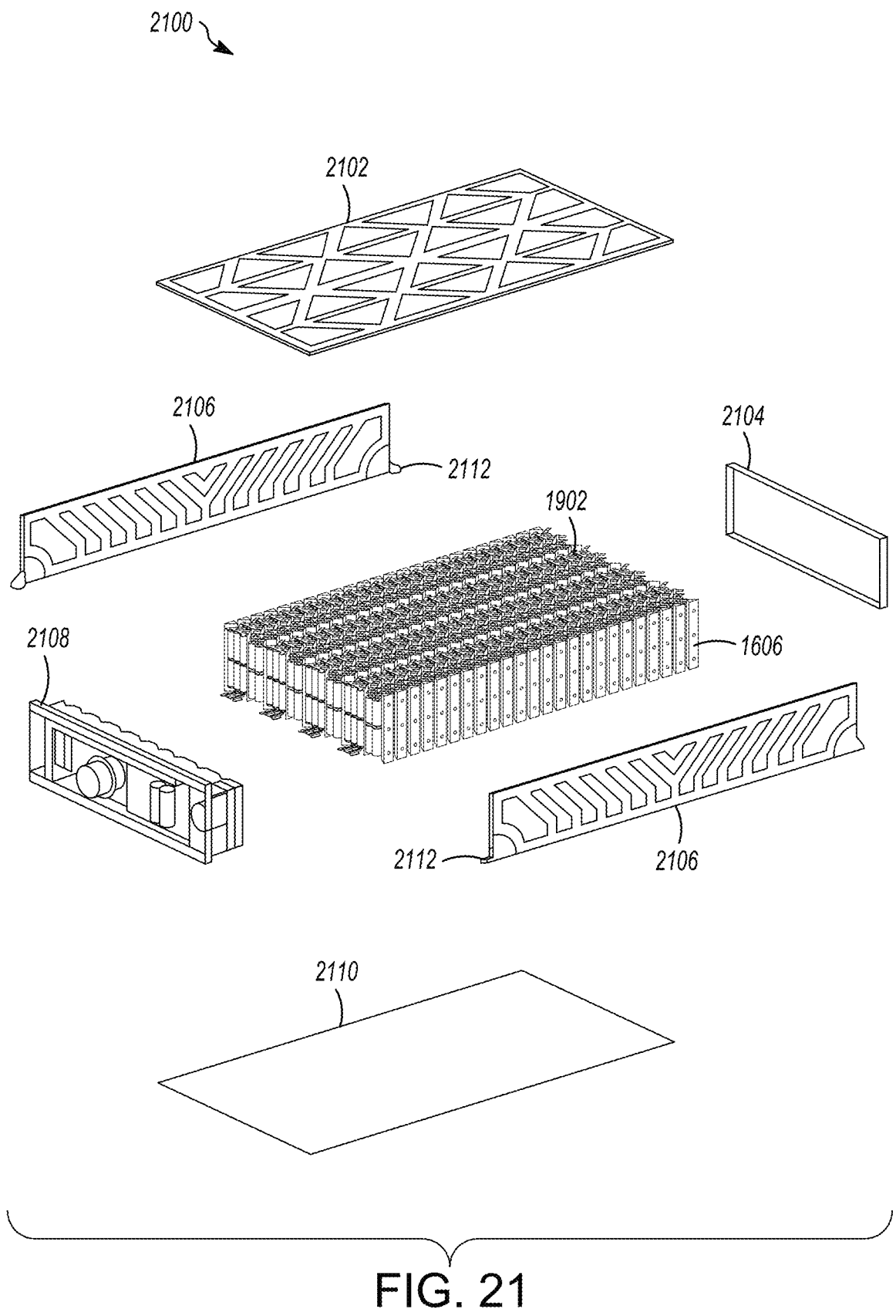
FIG. 21 illustrates an exploded view of a battery pack in accordance with another example.

FIG. 21 is an exploded view of a battery pack 2100 in accordance with another example. The battery pack 2100 comprises a cassette stack 1902, which is contained within a housing. The cassette stack 1902 is constructed of 25 battery cassettes 1700, each of which in turn includes 80 cylindrical battery cells secured within a collection of interconnected support structures 1106.

The housing includes a top cover 2102, an end plate 2104, a BMS module 2108, a pair of sidewalls 2106, and a bottom cover 2110. These components are connected and welded together (or otherwise sealed together) to create an environmental seal around the cassette stack 1902. Each of the sidewalls 2106 is attached to the end caps 1606 of each battery cassette 1700, and provides a load path from the cassette stack 1902 to a pair of mounting flanges 2112 located at the lower corners of each sidewall 2106. The mounting flanges 2112 are used to mount the battery pack 2100 to complementary mounting structures in the battery cavity of aerial vehicle 3600.

The BMS module 2108 and end plate 2104 are also attached to the sidewalls 2106. The top cover 2102 is made of titanium sheet for flame and vent gas containment and includes a Kapton layer on its lower surface for electrical insulation.

The bottom cover 2110 is also made of titanium sheet for flame and vent gas containment and includes a Kapton layer on its upper surface for electrical insulation as discussed previously. The bottom cover 202 is the final component in the thermal path between the battery cells and the outside air that includes the support structures 1106, the heat pipes 406 and the feet 412.

The bottom cover 2110 may be used to support both active and passive heat extraction from the battery pack 2100. Specifically, the bottom cover 2110 may be exposed as an outer surface of the aerial vehicle 3600, and thus subject to high velocity airflow during flight. This high velocity airflow is effective in passively extracting heat from the battery pack 2100. When the aerial vehicle is landed and docked, an active cooling system may furthermore thermally engage the bottom cover 2110, so as to actively extract thermal energy from the battery pack 2100.

Figure 22:
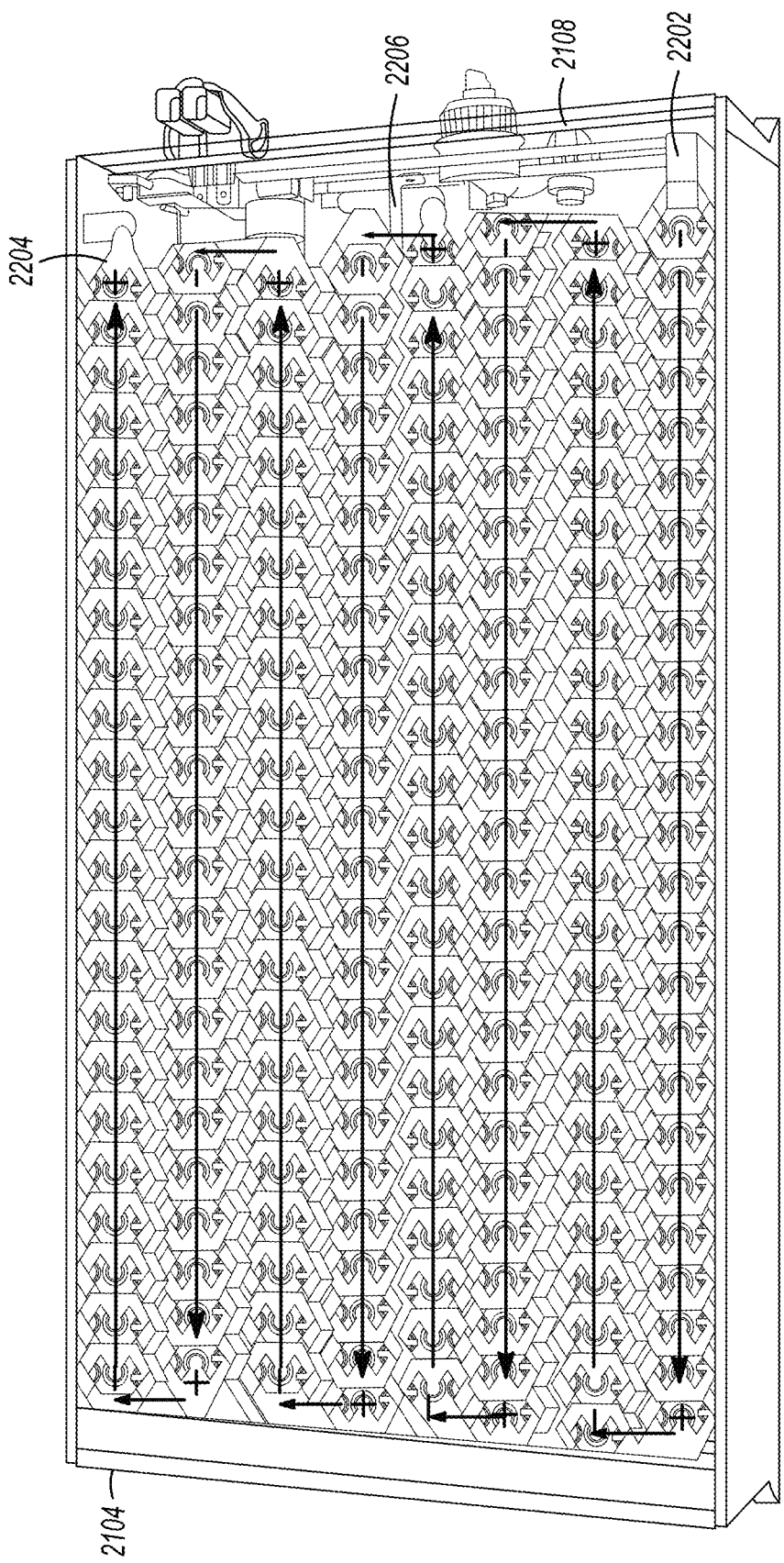
FIG. 22 illustrates a perspective view of a battery pack in accordance with one example.

FIG. 22 is a perspective view of a battery pack 2100, according to one example, and illustrates the direction of current flow between adjacent battery cassettes 1700, with the arrows indicating the direction of current flow within the battery pack 2100 and between the battery cassettes 1700 in operation of the battery pack 2100.

Referring to both FIG. 22 and FIG. 18, current returning to the battery pack 2100 enters the cassette stack 1902 at the positive terminal 2202 of the battery pack 2100 at the first (lowermost) group of cells (e.g. group one 1802 in FIG. 18) in the battery cassette 1700 located next to the BMS module 2108. As described above in more detail with reference to FIG. 18, current flows through the first group of cells from both upper and lower top cell interconnects 1708 to the ears 1604 and then to the upper and lower top cell interconnects 1708 in the group of cells (e.g. group two 1804) in the next battery cassette 1700. The current passes in this manner along the lowermost row of groups of cells in the battery pack 2100 from right to left, from one battery cassette 1700 to the next until it reaches the lowermost group of cells in the battery cassette 1700 next to the end plate 2104. An electrical interconnect then passes the current up (in the figure) to the next group of cells in the battery cassette 1700 next to the end plate 2104.

The current then flows in the opposite direction in the same manner as before, and this process repeats with the current passing back and forth and upward (in the figure) until the current exits the battery pack 2100 at the negative terminal 2204. Also provided, half way along the current path is a mid-pack fuse and disconnect block 2206 that may trip automatically or under control of the BMS module 2108 in case of a problem with the battery pack 2100.

Figure 23:
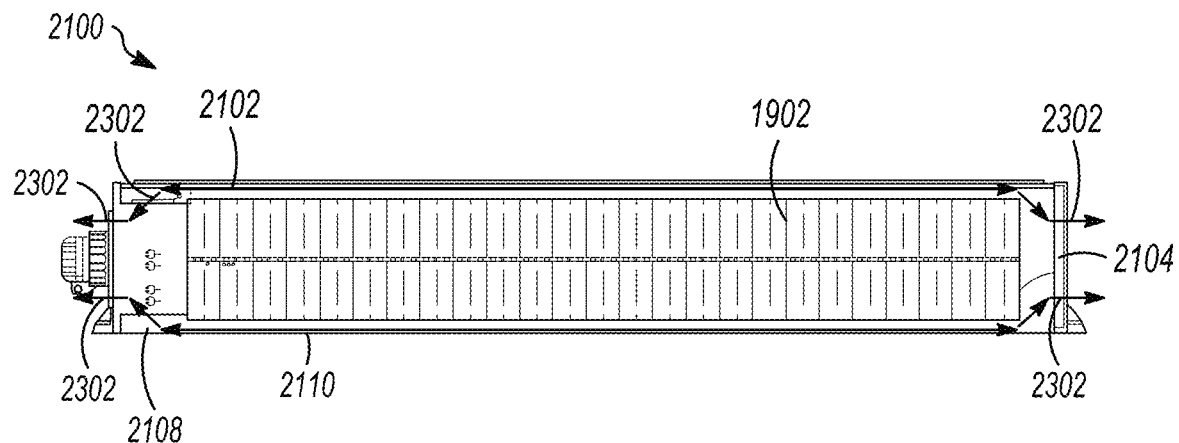
FIG. 23 illustrates a vertical and longitudinal cross section through a battery pack in accordance with one example.

FIG. 23 is a vertical and longitudinal cross section through the battery pack 2100 to illustrate the venting path for any flame, vent gas, or other cell ejecta. Any such cell emissions from the top layer of cells are directed towards the top cover 2102 and any such cell emissions from the bottom layer of cells are directed towards the bottom cover 2110 by virtue of the upper and lower cells being mounted with their vents facing away from each other in opposite directions as discussed above.

The emissions are initially contained by the battery pack enclosure (top cover 2102, bottom cover 2110 and sidewalls 2106) and are thus directed towards the BMS module 2108 and end plate 2104, where they pass out of the battery pack 2100 through a number of umbrella valves 2302 located in the end plate 2104 and the wall of the BMS module 2108. A gap (e.g. 15 mm) is provided between the cassette stack 1902 and the top cover 2102 for this purpose. Emissions directed towards the bottom cover 2110 flow below the individual cells and above the feet 1102 along the bottom cover 2110.

Figure 24:
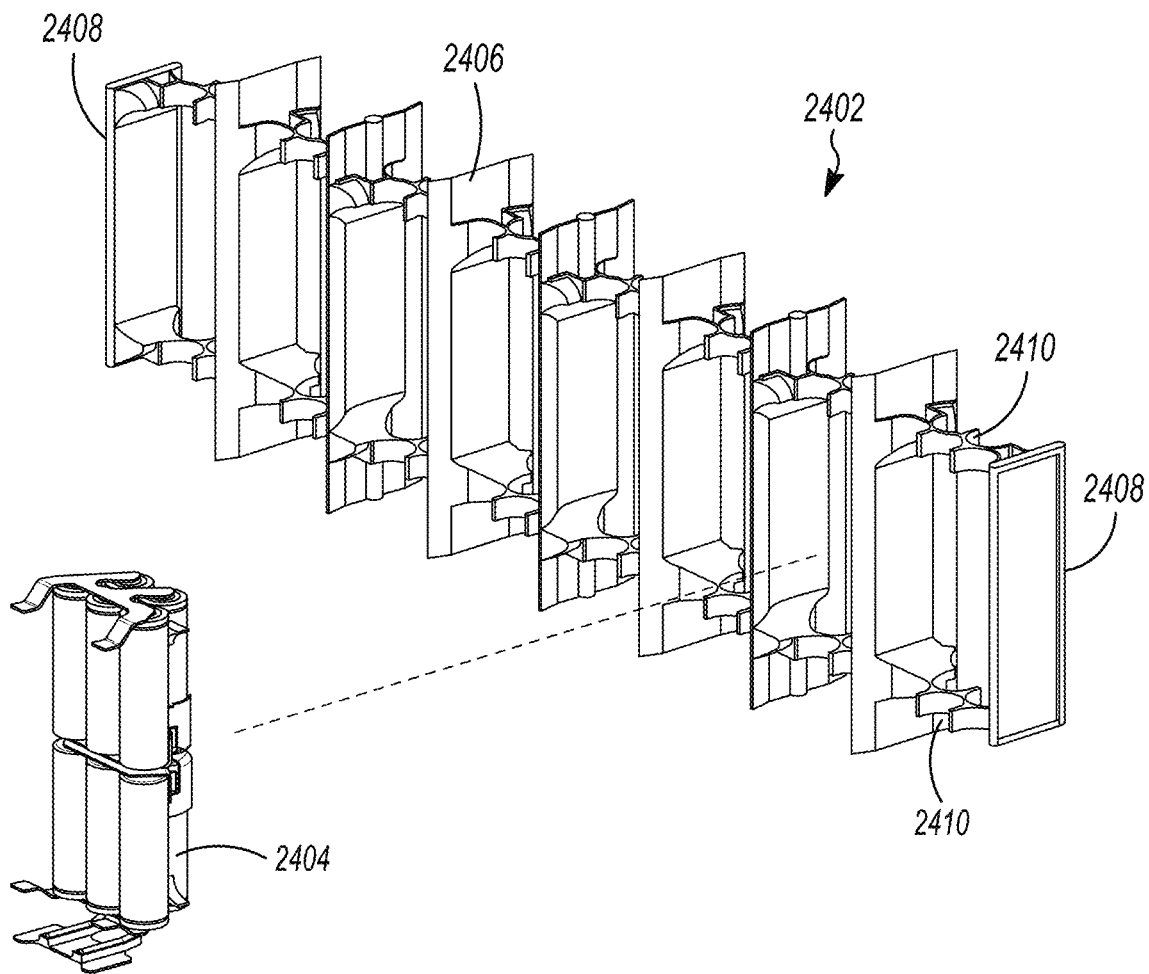
FIG. 24 illustrates a perspective view of a one-piece cassette chassis in accordance with one example.

FIG. 24 is a perspective view of a one-piece cassette chassis 2402 into which preassembled cell groups 2404 can be mounted, as an alternative to the cassette spines discussed above. The cassette chassis 2402 comprises a number of vertical dividers 2406 that separate and isolate adjacent cell groups 2404, as well as end caps 2408 for use in mounting the cassette chassis 2402 to the sidewalls 2106.

Upper and lower cross members 2410 separate the dividers 2406 from each other (and the end caps 2408 from the dividers 2406) to define spaces into which cell groups 2404 can be received. The cross members 2410 are shaped to conform to the external surface of a cell group 2404 on one side thereby to permit secure adhesive bonding of the cell groups 2404 into the cassette chassis 2402. It will be appreciated that the cassette chassis 2402 can hold two rows of cell groups 2404 compared to the cassette spines discussed above with reference to FIG. 4 and FIG. 16, which only comprise a single row of cell groups. The cassette chassis 2402 may be injection molded glass-filled PBT (Polybutylene Terephthalate).

Figure 25:
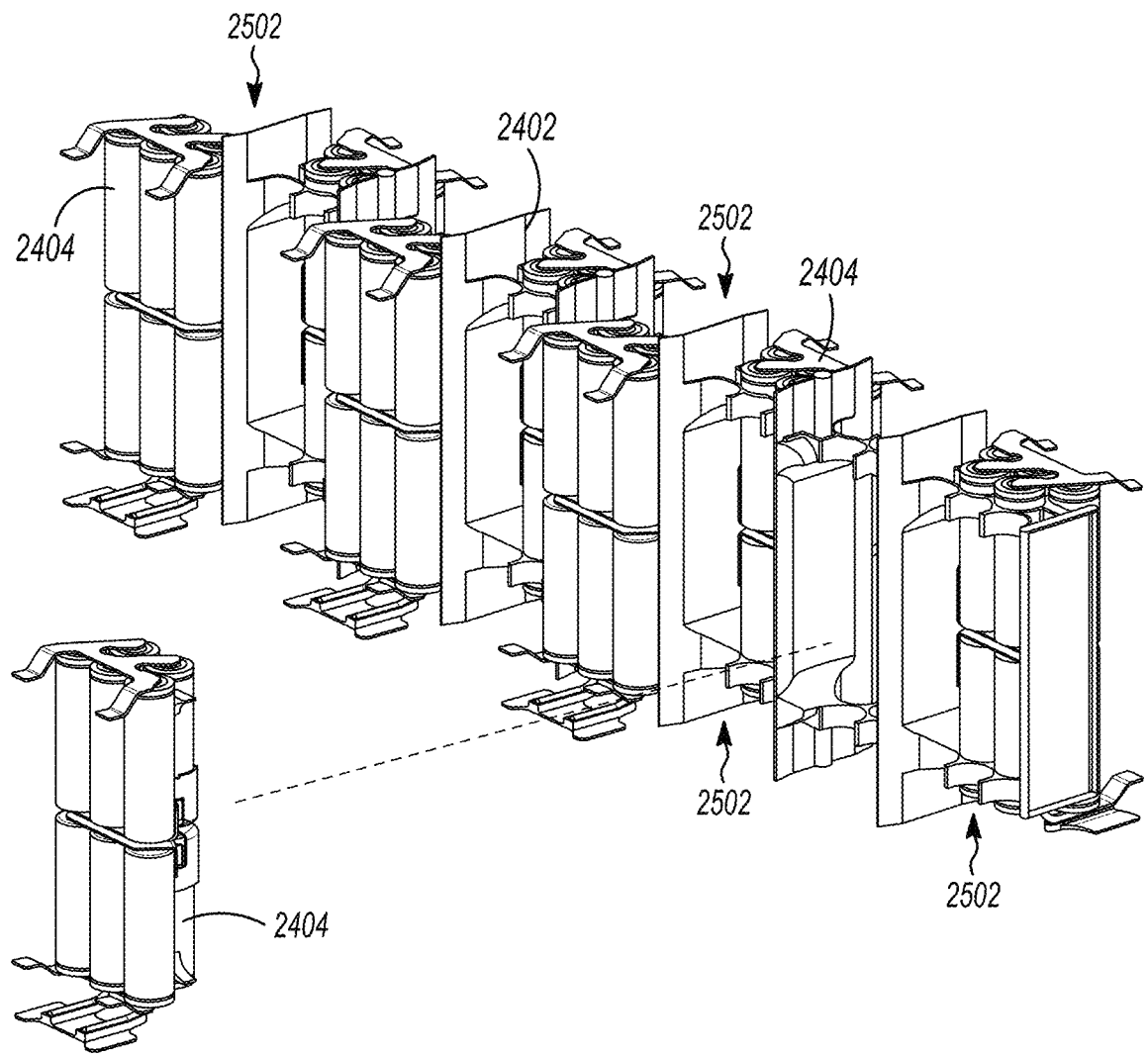
FIG. 25 illustrates a perspective view of the one-piece cassette chassis of FIG. 24, partially filled with preassembled cell groups.

FIG. 25 is a perspective view of the one-piece cassette chassis 2402 of FIG. 24, partially filled with preassembled cell groups 2404. As can be seen from the figure, the illustrated cell groups 2404 are shown as being assembled into the cassette chassis 2402 with the side of each cell group 2404 having four cells facing towards the cassette chassis 2402. Opposite each cell group 2404 placed into the cassette in this direction is a space (e.g. spaces 2502) that can receive a cell group 2404 with its six cell side facing towards the cassette chassis 2402. Accordingly, a cassette stack formed by assembling cell groups 2404 to a cassette chassis 2402 will have twice as many cells as a cassette stack 102 or a cassette stack 1902.

Forming the bridge or spine between cell groups as a cassette chassis 2402 reduces the number of parts and simplifies assembly of the cassette stack.

Figure 26:
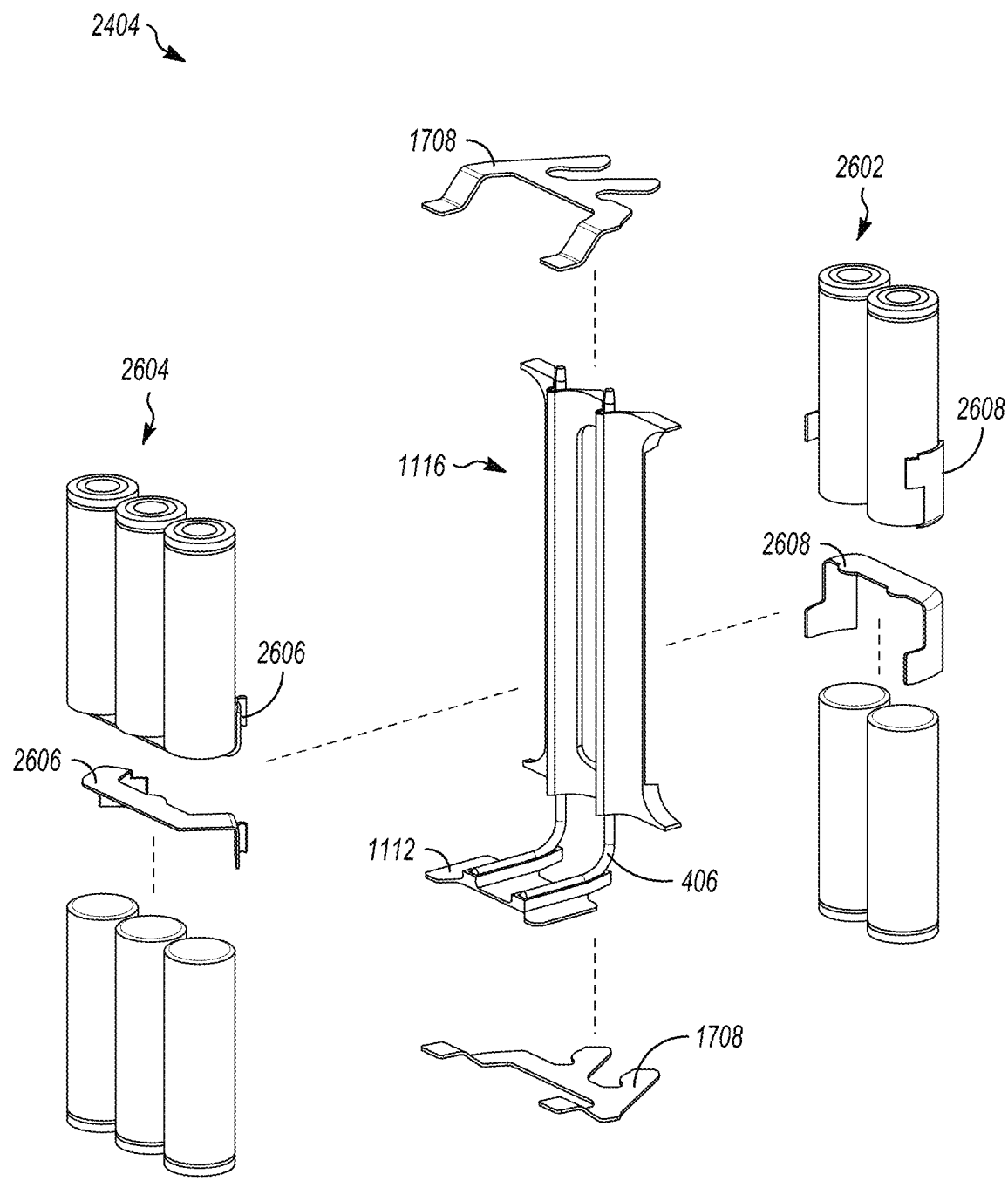
FIG. 26 illustrates an exploded perspective view of the cell group shown in FIG. 25 in accordance with one example.

FIG. 26 is an exploded perspective view of the cell group 2404 shown in FIG. 25, which illustrates specifically how the various components are assembled to form the cell group 2404

A first battery cell group 2602, with each of an upper pair and a lower pair battery cells being vertically stacked in an opposing orientation, are attached to a first side of a support structure 1116 including heat pipes 406 and a foot 1112. A second battery cell group 2604, with each of an upper three and a low three battery cells being vertically stacked in opposing directions, are attached to a second side of the support structure 1116. Specifically, each of the first battery cell group 2602 and battery cell group 2304 are bonded to a respective support structure 1116 by a thermally conductive epoxy, so as to thermally couple the battery cells to the support structure 1116 and so that the support structure 1116 can operationally conduct thermal energy to a heatsink.

Prior to attaching the battery cell groups, a bottom cell interconnect 2606 is welded to the negative terminals of each of the second battery cell group 2604 and a bottom cell interconnect 2608 is welded to the negative terminals of each of the first battery cell group 2602 prior to the assembly of each battery group to the support structure 1116. Each bottom cell interconnect 2606 and bottom cell interconnect 2608 has a pair of wings that depend therefrom along the side of the battery cell group and which, when the relevant set of battery cells is inserted into a support structure 1116, are in electrical contact (e.g., through an electrically conductive weld) with, and form part of, the support structure 1116. Accordingly, each support structure 1116 is electrically coupled to the negative terminals of a group of ten battery cells that are mounted to the support structure 11166, which effectively becomes a negative terminal for all ten of the cells mounted thereto.

After assembly of second first battery cell group 2602 and second battery cell group 2604 to support structure 1116, a top cell interconnect 1708 is welded to the top ends (positive terminals) of the upper five cylindrical battery cells, and also to the lower ends (also the positive terminals) of the lower five cylindrical battery cells.

Each of the top cell interconnects 1708, bottom cell interconnect 2606 and bottom cell interconnect 2608 is constructed from aluminum and stamped to create a laminated bus between the respective positive ends of a groups of ten cells and the negative terminals of an adjacent group of ten cells in that are either in the same battery cassette or an adjacent battery cassette as discussed with reference to FIG. 25.

Figure 27:
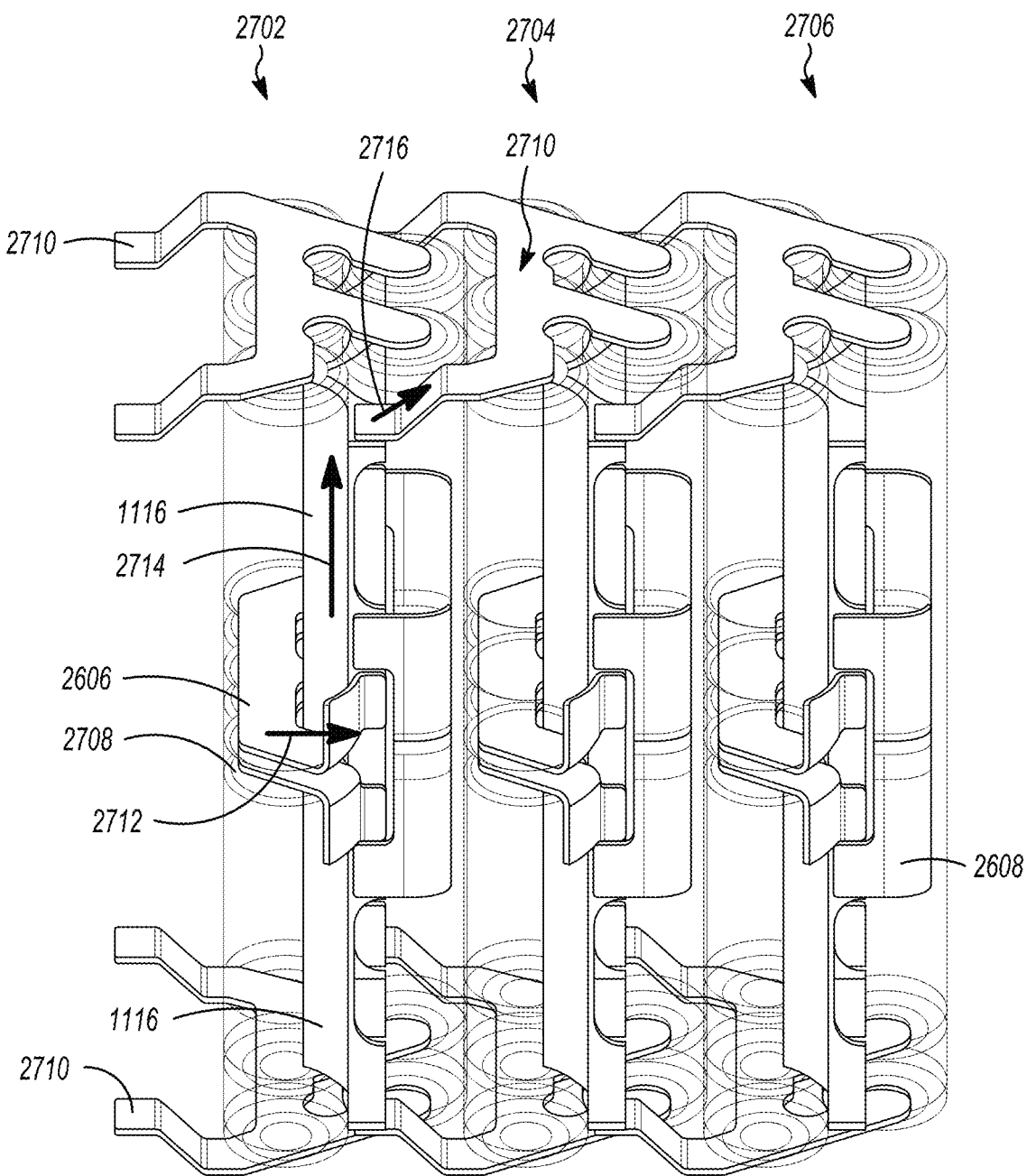
FIG. 27 is a perspective view illustrating the electrical interconnections between adjacent battery cell groups in accordance with one example.

FIG. 27 is a perspective diagram illustrating the electrical interconnections between adjacent battery cell groups 2404. Illustrated are three groups of battery cells, group one 2702, group two 2704 and group three 2706. As can be seen from the figure, and also referring to FIG. 26, current flows from the negative terminals 2708 of the cells in group one 2702, through the bottom cell interconnects 2606 and the bottom cell interconnects 2608 into the support structure 1116 as shown by arrow 2712. The current then flows in either direction along support structure 1116 toward the upper and lower top cell interconnects 2710 as shown by arrow 2714. The current then flows through each top cell interconnect 2710 of group two 2704 as shown by arrow 2716 to the positive terminals of the cells in group two 2704. After passing through the cells in group two 2704, the current then leaves the negative terminals of the cells in group two 2704 where it passes though the group two 2704 bottom cell interconnects 2606, bottom cell interconnects 2608, support structure 1116 and on to the group three 2706 top cell interconnects 2710, and so on.

Figure 28:
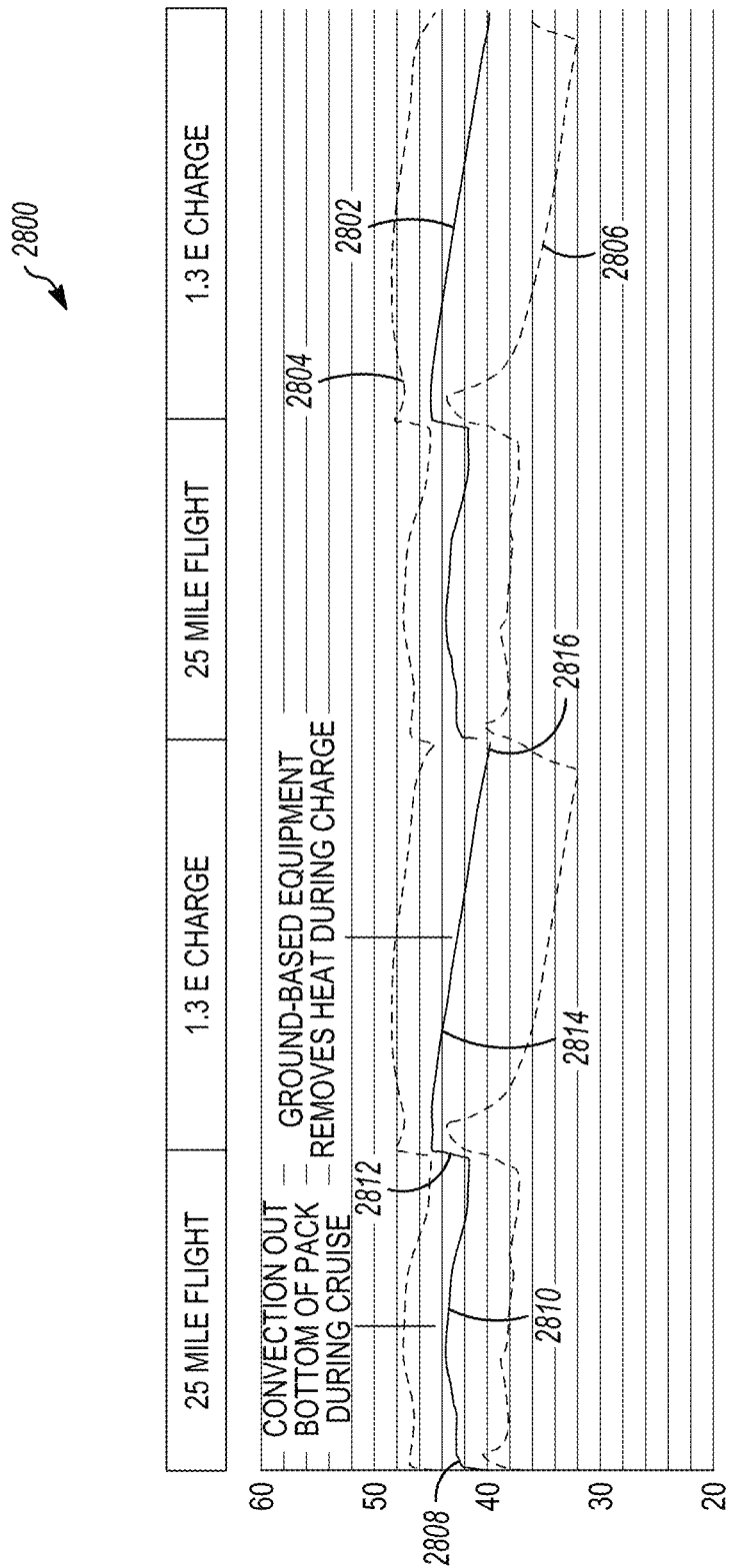
FIG. 28 illustrates a battery temperature graph in accordance with one example.

FIG. 28 shows a temperature graph 2800, illustrating the effect of passive cooling as a result of airflow over a heat sink (e.g., bottom cover 2110) and via ducting, described above, and active cooling, described below, through various operational states of the aerial vehicle 3600. An example of the variation of the average temperature of a battery pack 2100 over repeated flights and recharge cycles is illustrated by temperature curve 2802, which is preferably within an operational envelope defined by upper limit 2804 and lower limit 2806.

At takeoff, the battery pack may for example have an average desired temperature of about 40 deg C. As the aerial vehicle 3600 performs a vertical takeoff, the average temperature will rise at 2808, since there is not much flow of air over the bottom cover 2110 or through the ducting. In the absence of any convection, the power draw on the battery would result in an increase of about 25 deg C., but as the aerial vehicle 3600 transitions to horizontal flight, airflow over the bottom cover 2110 and ducted flow over the top cover 302 increase the heat transfer from the battery and the average temperature stabilizes as at 2810. As the as the aerial vehicle 3600 transitions to vertical flight for landing, reduced airflow causes the average temperature to rise as at 2812. Once the aerial vehicle 3600 has landed and is being recharged, ground-based cooling removes residual heat from the landing as well as additional heat generated by recharging the battery as at 2814, with a goal of returning the average temperature to 40 deg. C. for the next flight as at 2816. This temperature cycle then repeats throughout a typical day.

Figure 29:
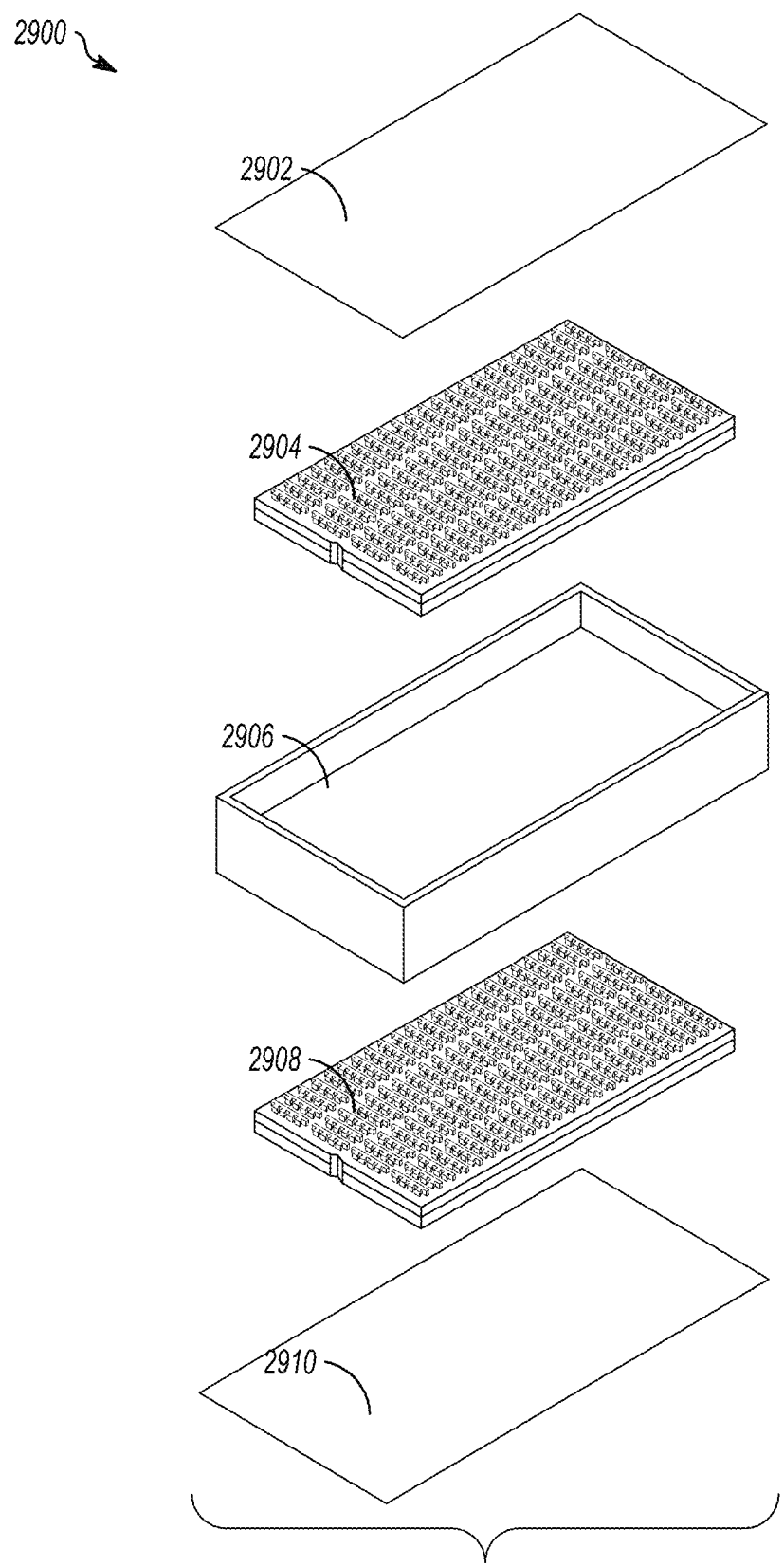
FIG. 29 illustrates a battery pack in accordance with another example.

FIG. 29 is an exploded perspective view of a battery pack 2900, according to a further example. The battery pack 2900 is constructed using a number of submodules, which are further illustrated in subsequent figures. At a high-level, the battery pack 2900 has a housing comprising a top cover 2902, an enclosure 2906, and a bottom cover 2910. The enclosure 2906 defines upper and lower cavities, with a first battery module 2904 being located in the upper cavity, and a second battery module 2908 being in the lower cavity. The housing provides an environmental seal for each of the battery module 2904 and enclosure 2906. The battery module 2904 and battery module 2908 differ from those described with respect to FIG. 1, in that they are only one cell in height.

Figure 30:
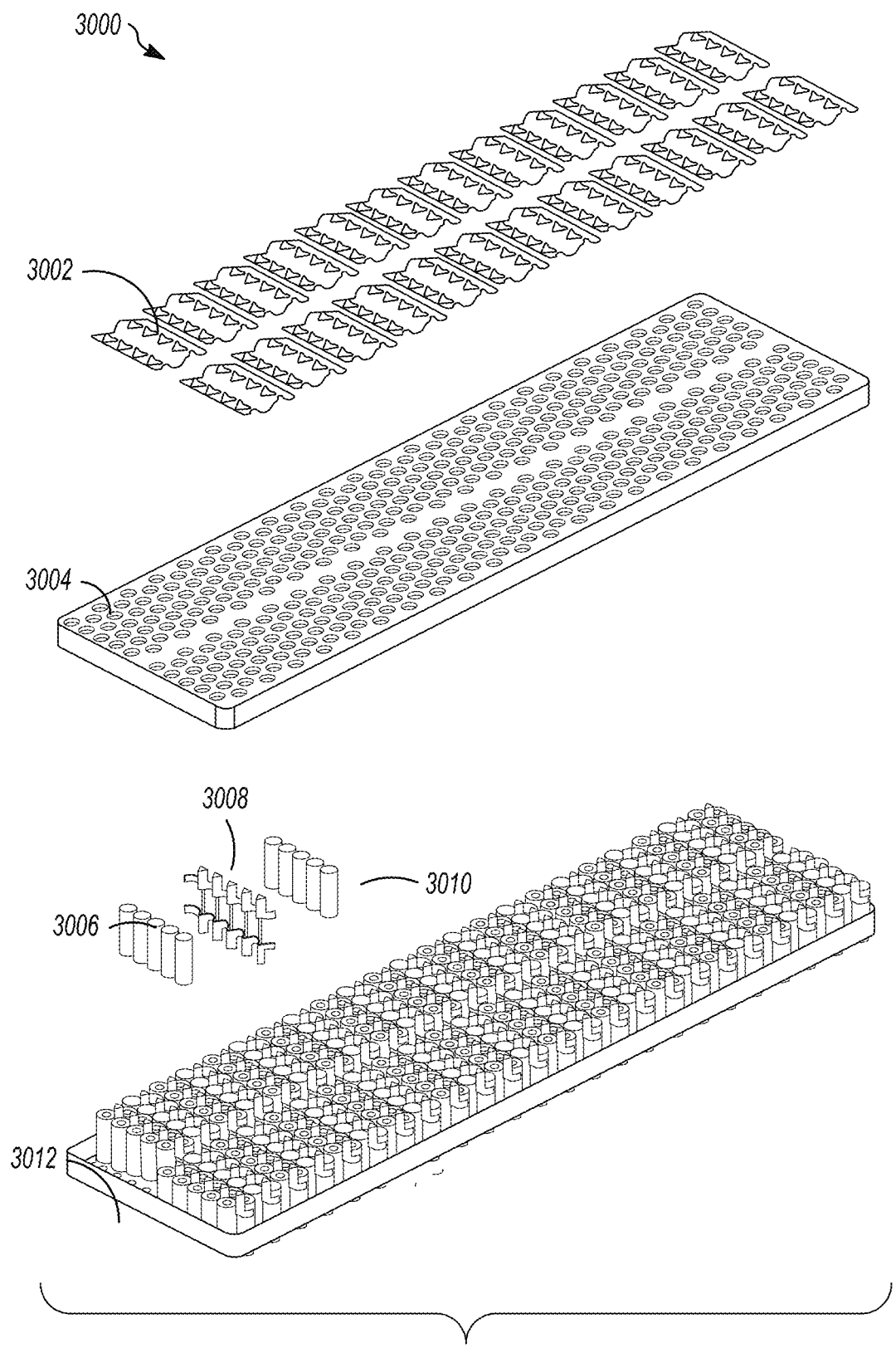
FIG. 30 illustrates a battery submodule in accordance with one example.

FIG. 30 is an exploded perspective view of a battery submodule 3000, according some examples, which may be used to construct each of the battery module 2904 and battery module 2908. Specifically, each of the battery module 2904 and battery module 2908 may be constructed of a pair of battery submodules 3000.

Each battery submodule 3000 is constructed using multiple battery cell assemblies, each battery cell assembly comprising a first cell group 3006 and a second cell group 3010, which are mounted, in opposite orientation, to a support structure 3008. For example, the battery cells of the first cell group 3006 may be oriented with their positive ends at an upper end of a cell assembly, and the battery cells of the second cell group 3010 may be oriented with their positive ends at a lower end of a cell assembly. A cell interconnect 3002 is positioned on top of the top ring cap 3004.

Multiple cell assemblies are then sandwiched between a top ring cap 3004 and a bottom ring cap 3012.

Figure 31:
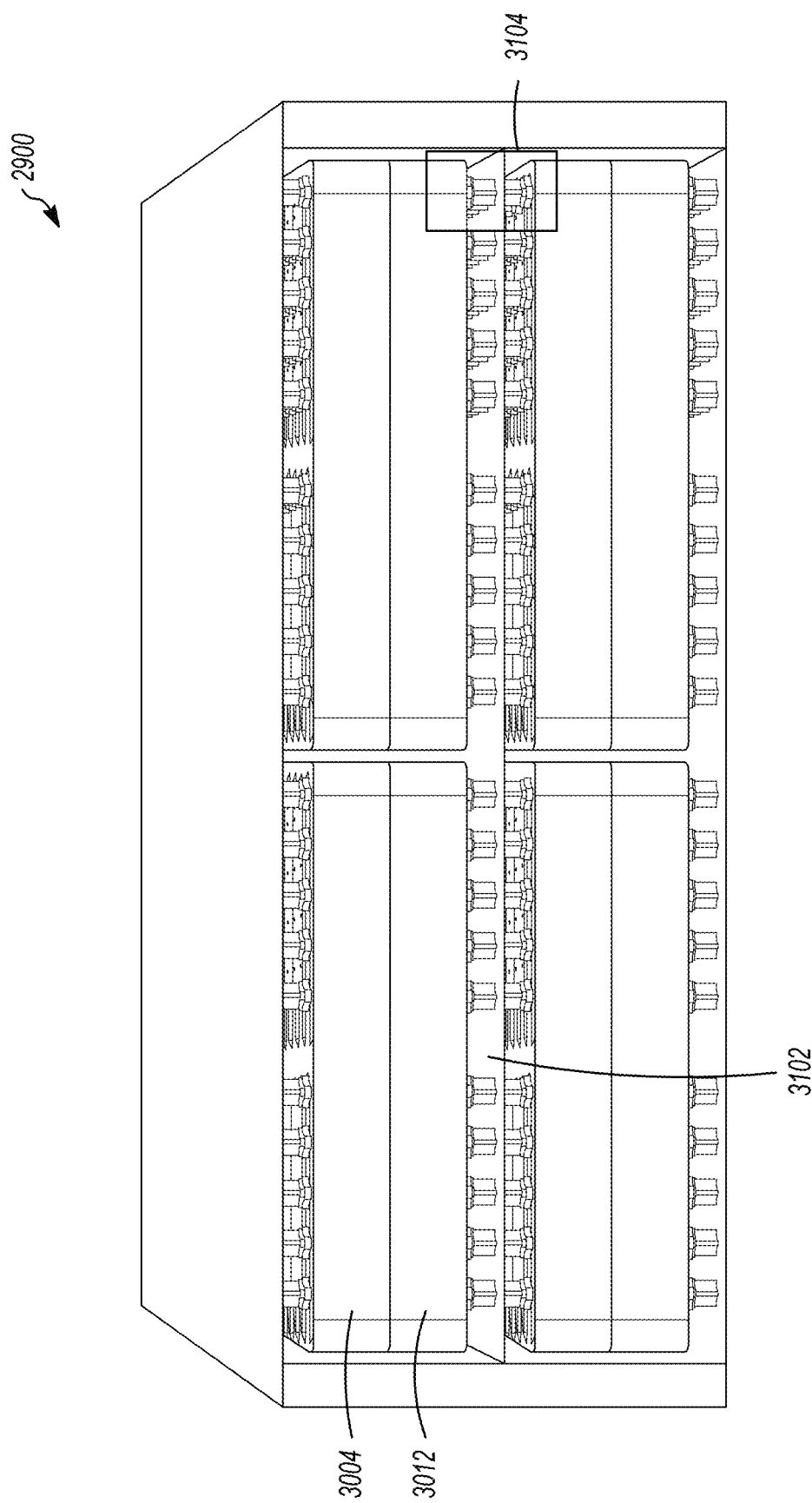
FIG. 31 illustrates a battery pack in accordance with an example.

FIG. 31 shows further details regarding the battery pack 2900, illustrating location of a firewall 3102 in the enclosure so as to create a split between the battery module 2904 and battery module 2908. A thermal path 3104 passes through the firewall 3102.

Figure 32:
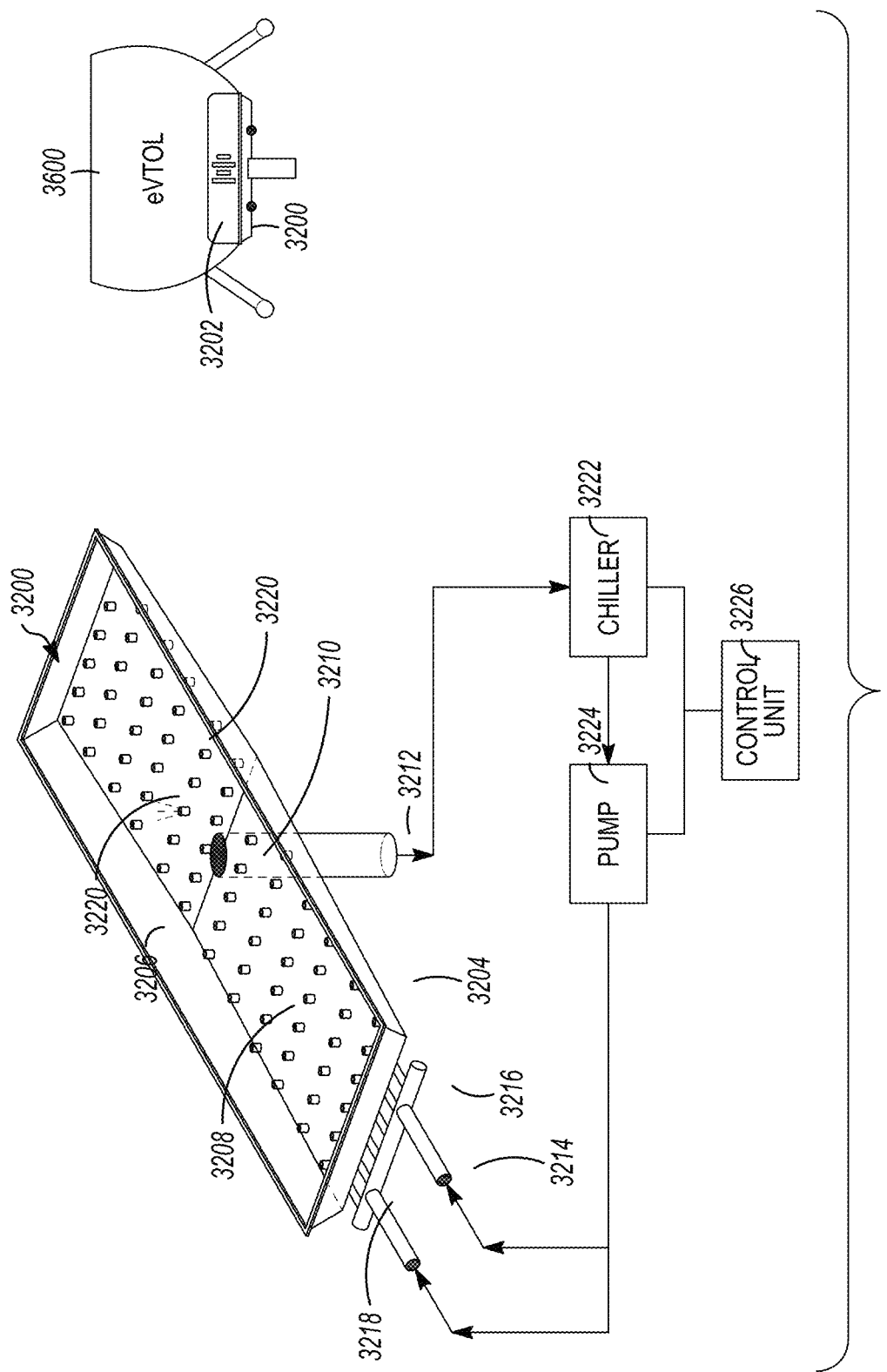
FIG. 32 illustrates a perspective view of a spray cooler in accordance with one example.

FIG. 32 is a perspective view of a spray cooler 3200 for use in ground-based cooling of one or more battery packs 3202 located on the underside of an aerial vehicle 3600.

The spray cooler 3200 comprises a rectangular trough 3204 with a compliant seal 3206 around its upper periphery to make a rough seal against the battery packs 3202 and/or the underside of the aerial vehicle 3600. The spray cooler 3200 also has a floor 3208 that is sloped from both ends of the spray cooler 3200 towards a drain 3210 located in the center of the spray cooler 3200. The drain 3210 is connected to an outlet pipe 3212, which returns warmer water to a chiller 3222 where it is cooled prior to return to the spray cooler 3200.

Cold water from the chiller 3222 is fed to the trough through two inlet pipes 3214, passing through a manifold 3216 into a series of pipes 3218 running underneath the spray cooler 3200. The pipes 3218 feed an array of spray heads 3220 mounted to the floor of the spray cooler 3200 and that are arranged to spray cold water upwards to cool the one or more battery packs 3202.

In use, the aerial vehicle 3600 is either positioned over the spray cooler 3200 or the spray cooler 3200 is positioned under the aerial vehicle 3600 (for example, the spray cooler 3200 may be mounted on a cart). The spray cooler 3200 is then raised by an appropriate mechanism until the seal 3206 engages the one or more battery packs 3202 or the underside of the aerial vehicle 3600. Cold water is then sprayed against the underside of the one or more battery packs 3202 (e.g. against the bottom cover 2110 of each battery pack) or the underside of the aerial vehicle 3600 to transfer heat from the one or more battery packs 3202 to the water.

The trough 3204 collects the water and, after exiting the spray cooler 3200 via the drain 3210, the warmer/hotter water returns to a chiller 3222 (e.g. a heat pump or refrigeration unit) to cool the water before returning it to the spray cooler 3200 via the inlet pipes 3214. Additional necessary equipment is provided to ensure the proper functioning of the spray cooler 3200, e.g. a pump 3224 to circulate the water, temperature sensors to monitor the water temperature, and an appropriate manual or automated control unit 3226 to turn on or shut off the spray cooler 3200 at an appropriate time or when appropriate conditions are detected, for example when the battery packs 3202 are charged and at the target temperature.

In one example, the water entering the 2900 is at 2.5 deg C., the water leaving the 2900 is at 7.5 deg C., to maintain the bottom of the battery pack 3202 at 10 deg C.

Figure 33:
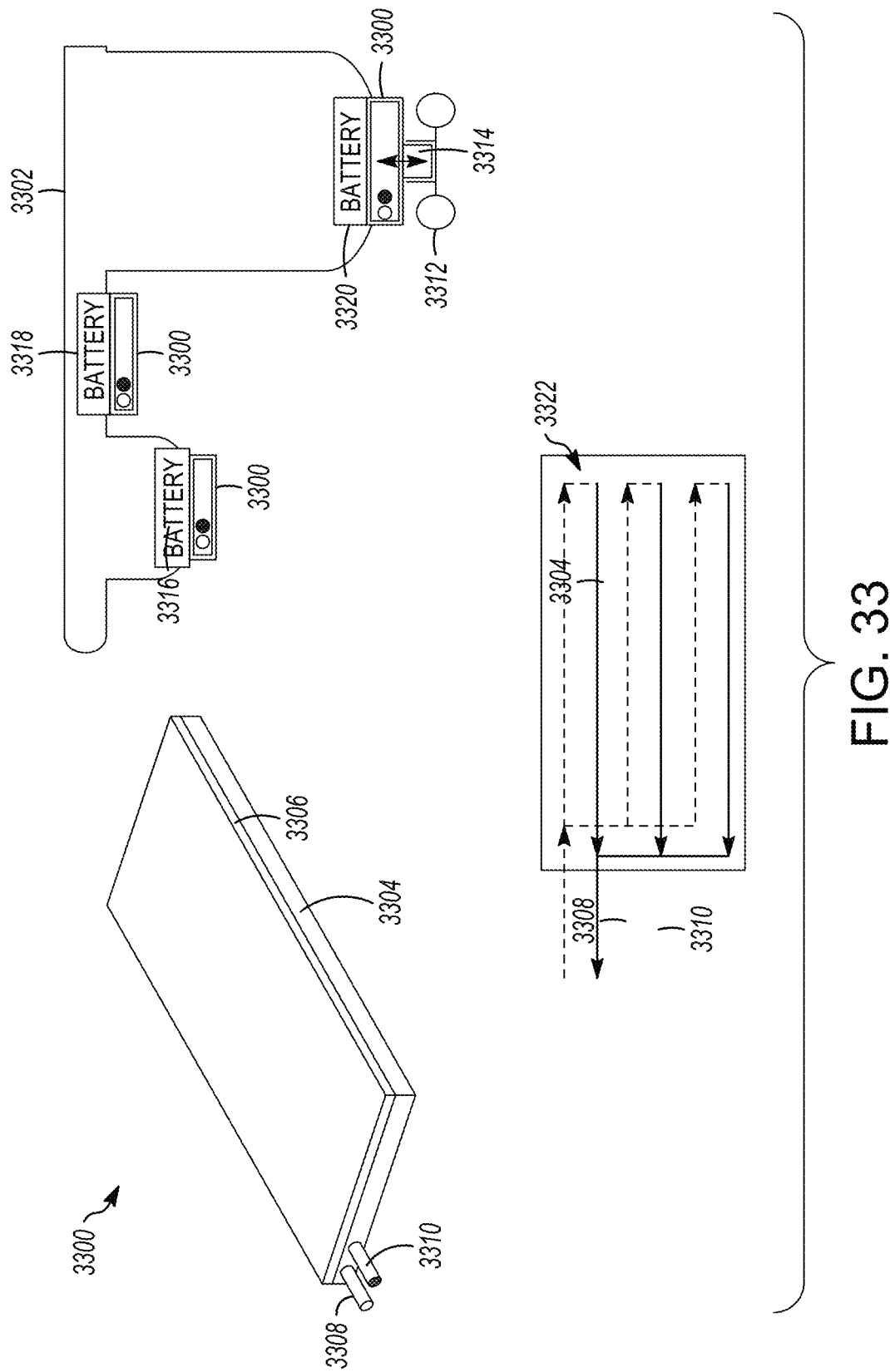
FIG. 33 illustrates a perspective view of a cold plate in accordance with one example.

FIG. 33 is a perspective view of a cold plate 3300 for use in ground-based cooling of one or more battery packs, e.g. battery pack 3320 located on the underside of an aerial vehicle 3302.

The cold plate 3300 comprises a rectangular block 3304 that has internal fluid channels formed therein through which a coolant (e.g. water) can be circulated to cool the block 3304. The internal fluid channels are coupled to a cold inlet 3308 and a warm outlet 3310. As can be seen from the schematic 3322, in one example the coolant enters the block 3304 at the cold inlet 3308 and is distributed to a number of channels that run in parallel along the length of the block 3304 from a first end to a second end of the block 3304. Each channel then returns in the opposite direction from the second end to the first end, where they are combined into a single channel that is coupled to the warm outlet 3310.

Located on the upper surface of the block 3304 is a pad 3306 made of a material that is compliant and transfers heat efficiently. This permits the cold plate 3300, to make reasonably intimate contact with the battery pack 3320 for efficient heat transfer from the battery pack and/or the underside of the aerial vehicle to the cold plate 3300.

Additional necessary equipment is provided to ensure the proper functioning of the cold plate 3300 is provided, as discussed with reference to FIG. 32, e.g. a chiller 3222 (a heat pump or refrigeration unit) to supply cold coolant to the cold inlet 3308 and receive warm/hotter coolant from the 3010, a pump 3224 to circulate the coolant, temperature sensors to monitor the coolant temperature, and an appropriate manual or automated control unit 3226 to turn on or shut off circulation of coolant through the cold plate 3300 at an appropriate time or when appropriate conditions are detected, for example when the battery packs 3202 are charged and at the target temperature.

In use, the aerial vehicle 3302 is either positioned over the cold plate 3300 or the cold plate 3300 is positioned under the aerial vehicle 3600. In the illustrated example, the cold plate 3300 is mounted on a cart 3312 that can be positioned under the aerial vehicle 3302 The cold plate 3300 is then raised by an appropriate lift mechanism 3314 until the pad 3306 engages the battery pack 3320 or the underside of the aerial vehicle 3600. Coolant is then circulated through the cold plate 3300 to transfer heat from the battery pack 3320 (or one or more battery packs) to the coolant. Upon after exiting the cold plate 3300 via the warm outlet 3310, the warmer/hotter coolant returns to the chiller 3222 to be cooled before being returned to the block 3304 via the cold inlet 3308.

As can be seen from the figure, the cold plate 3300 can be adapted in size and shape for use with different battery packs, e.g. battery pack 3316 in an engine nacelle or battery pack 3318 in a wing.

Figure 34:
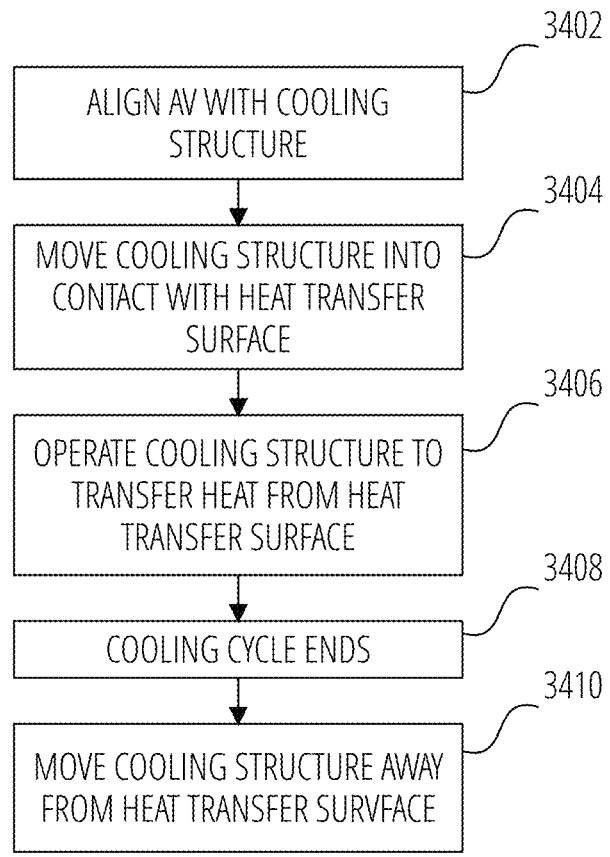
FIG. 34 illustrates a flowchart describing cooling of a battery pack in accordance with one example.

FIG. 34 is a flowchart describing cooling of a battery pack in accordance with one example, using the cooling structures described above with reference to FIG. 32 and FIG. 33.

The method commences at operation 3402 with the aerial vehicle 3600 and the cooling structure (e.g. spray cooler 3200 or cold plate 3300) being aligned. This can be accomplished by the aerial vehicle 3600 moving into position above or at the cooling structure, or by the cooling structure being moved into position under or at the aerial vehicle 3600, or some combination of the two. The cooling structure may for example be located at a charging station for the aerial vehicle 3600, and alignment may occur once the aerial vehicle 3600 is parked at the charging station. The alignment between the aerial vehicle 3600 and the cooling structure may be verified automatically, for example by having the control unit 3226 detect or recognize markings or features on the bottom cover of the battery pack or on the bottom of the aerial vehicle 3600.

When the aerial vehicle 3600 and the cooling structure are aligned, the cooling structure is moved into contact with a heat transfer surface of the aerial vehicle 3600 or of the battery pack 100 at operation 3404 using a lift mechanism 3314 in one example. The cooling structure is then operated, as described for example with reference to FIG. 32 or FIG. 33, to transfer heat from the heat transfer surface at operation 3406. The movement and activation of the cooling structure may be performed by an operator actuating the lift mechanism 3314 and the control unit 3226. Alternatively, the movement and activation of the cooling structure may be accomplished under computer control. For example, under control of one or more processors in the aerial vehicle 3600, in a collocated charging station or in the control unit 3226.

Computer control of the operation of the cooling structure will depend on a number of factors, including for example the state of charge or charging of the battery and the temperature of the battery pack. Appropriate direct or networked communications links will be established to, for example, permit instructions to be passed from the aerial vehicle 3600 to the control unit 3226, or from the charging station to the control unit 3226, or for the control unit 3226 to receive appropriate parameters from the aerial vehicle 3600 or the charging station.

For example, operation 3404 and operation 3404 could commence after the alignment of operation 3402 if the temperature of the battery pack 100 is above a certain value, or charging of the battery pack 100 has commenced.

Operation 3404 continues until the cooling cycle ends at operation 3408. Ending of the cooling cycle can be determined manually or can be done under computer control. For example, the end of the cooling cycle can be detected when charging of the battery pack 100 ceases and the temperature of the battery pack 100 reaches a target minimum threshold.

In response to the cooling cycle ending, the cooling structure is moved away from the heat transfer surface at operation 3410 using, for example, the lift mechanism 3314. Additionally, the operation of the cooling structure itself will typically end, either at the time the cooling cycle ends or shortly thereafter. Movement of the cooling structure away from the heat transfer surface and termination of operation of the cooling structure can be performed manually or under computer control after the end of the cooling cycle has been determined or signaled.

Figure 35:
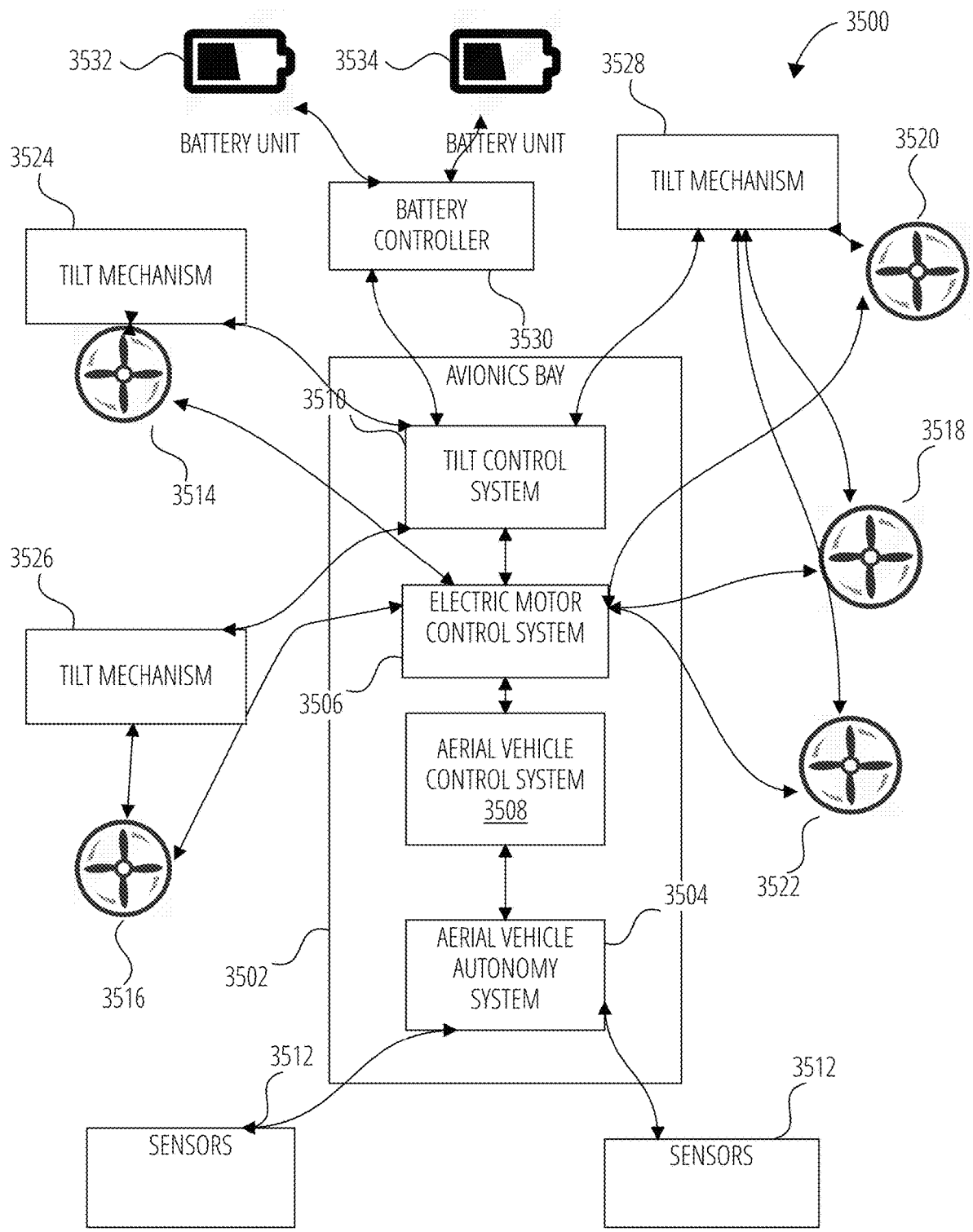
FIG. 35 illustrates an avionics system 3500 for an aerial vehicle 3600, in accordance with some examples.

FIG. 35 is a block diagram illustrating an avionics system 3500, including an aerial vehicle control system 3508, an aerial vehicle autonomy system 3504, an electric motor control system 3506 and tilt control system 3510, located within the avionics bay 3502 of one of the aerial vehicles discussed herein. The battery unit 3532 or the battery unit 3532 may be constructed as described herein.

The avionics system 3500 may be primarily located within an avionics bay 3502 of an aerial vehicle. Turning to each of the respective components, the aerial vehicle autonomy system 3504 it is responsible for autonomous or semiautonomous operation of an aerial vehicle, and is communicatively coupled to the sensors 3512 of the relevant aerial vehicle. The sensors 3512 may include LIDAR sensors, radar sensors and cameras, merely for example. The aerial vehicle autonomy system 3504 it is communicatively coupled to the primary aerial vehicle control system 3508, which is in turn coupled to the various pitch, yaw and throttle controllers of the aerial vehicle. The aerial vehicle control system 3508 may further control the electric motor control system 3506. The electric motor control system 3506 in turn operationally controls electric motors of the aerial vehicle, including a number of rotors (or propulsors) of the aerial vehicle. These rotors include a fixed rotor 3514, a fixed rotor 3516, a right rear (or aft) tilt rotor 3522, a left forward tilt rotor 3520 and a right forward tilt rotor 3518. In the example, the fixed rotor 3514 and the fixed rotor 3516 are each mounted on a respective tilting outer wing sections of first and second wings of the aerial vehicle. The tilt rotor 3522 and tilt rotor 3520 are mounted respectively on a first engine nacelle and a second engine nacelle, these nacelles being tiltable.

The aerial vehicle control system 3508 is furthermore communicatively coupled to, and controls a tilt control system 3510. The tilt control system 3510 is responsible for the tilting or rotation of various components of the aerial vehicle in order to provide enhanced control and flight stability of the aerial vehicle, as well as the implementation of countermeasures to mitigate the impact of an electrical or component failure of the aerial vehicle. To this end, the tilt control system 3510 is shown to be communicatively coupled to a tilt mechanism 3524 (e.g., which includes a rotator to rotate a rotor wing on which is mounted the fixed rotor 3514), a tilt mechanism 3526 (e.g., which includes a rotator to rotate a rotor wing on which is mounted the fixed rotor 3516), a tilt mechanism 3528 (e.g., which includes rotators to rotate forward tilt each of the left forward tilt rotor 3520, the right to react tilt rotor 3522 and the right forward tilt rotator 116.

The tilt control system 3510 is also communicatively coupled to, controls, a battery controller 3530 that is operatively able to move (e.g., rotate or laterally move) a battery unit 3532 and a battery unit 3534 of a battery system of the aerial vehicle. Further details regarding operations of the various systems and subsystems described in FIG. 35 will be provided below.

Figure 36:
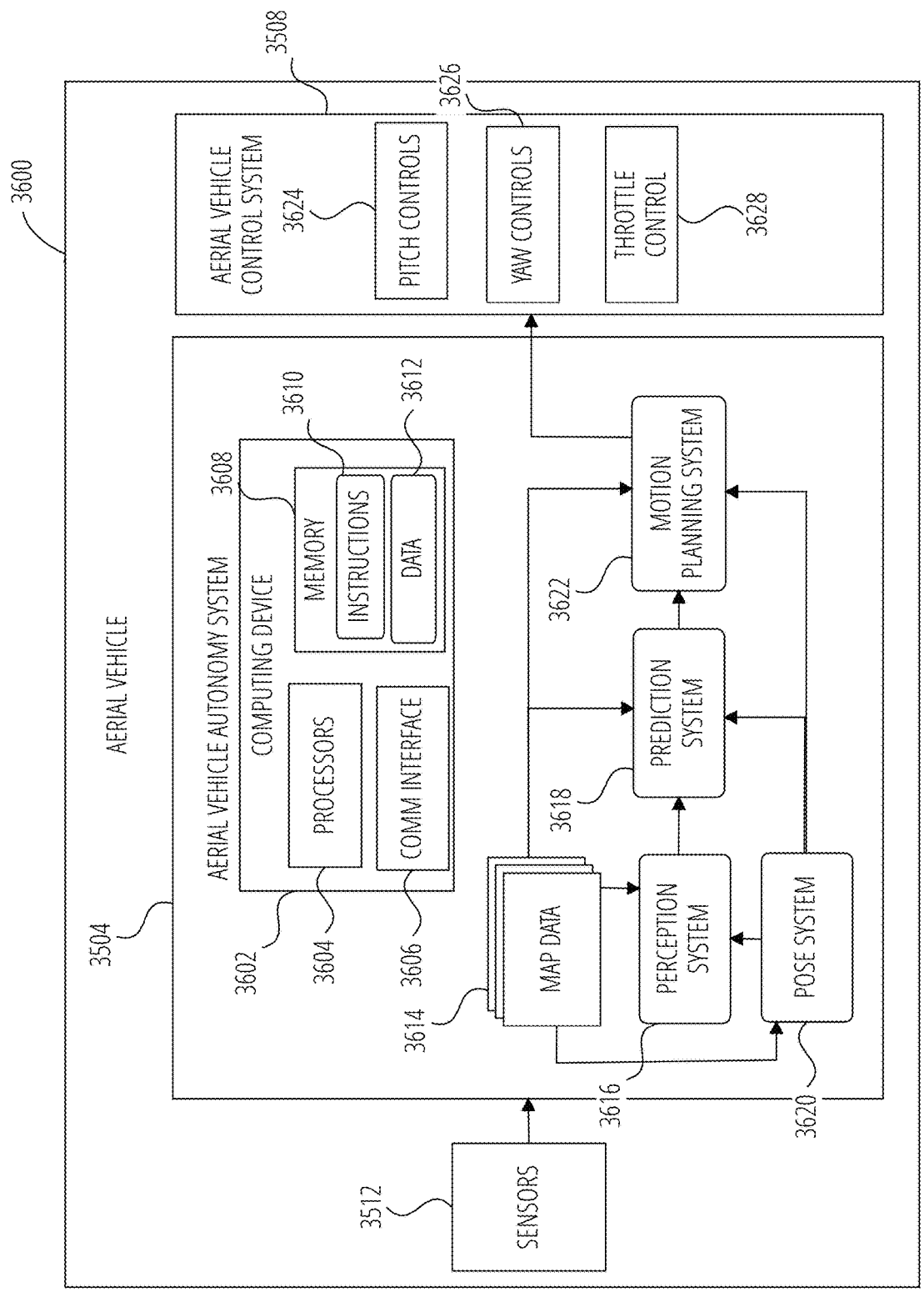
FIG. 36 is a diagrammatic representation of an autonomous aerial vehicle 3600, in accordance with some examples.

FIG. 36 is a block diagram showing a system architecture of an aerial vehicle 3600, according to example aspects of the present disclosure. The aerial vehicle 3600 can be, for example, be an autonomous or semi-autonomous aerial vehicle. The aerial vehicle 3600 includes one or more sensors 3512, an aerial vehicle autonomy system 3504, and one or more aerial vehicle control system 3508.

The aerial vehicle autonomy system 3504 can be engaged to control the aerial vehicle 3600 or to assist in controlling the aerial vehicle 3600. In particular, the aerial vehicle autonomy system 3504 receives sensor data from the sensors 3512, attempts to comprehend the environment surrounding the aerial vehicle 3600 by performing various processing techniques on data collected by the sensors 3512 and generates an appropriate motion path through an environment. The aerial vehicle autonomy system 3504 can control the one or more aerial vehicle control system 3508 to operate the aerial vehicle 3600 according to the motion path.

The aerial vehicle autonomy system 3504 includes a perception system 3616, a prediction system 3618, a motion planning system 3622, and a pose system 3620 that cooperate to perceive the surrounding environment of the aerial vehicle 3600 and determine a motion plan for controlling the motion of the aerial vehicle 3600 accordingly.

Various portions of the aerial vehicle autonomy system 3504 receive sensor data from the sensors 3512. For example, the sensors 3512 may include remote-detection sensors as well as motion sensors such as an inertial measurement unit (IMU), one or more encoders, etc. The sensor data can include information that describes the location of objects within the surrounding environment of the aerial vehicle 3600, information that describes the motion of the vehicle, etc.

The sensors 3512 may also include one or more remote-detection sensors or sensor systems, such as a LIDAR, a RADAR, one or more cameras, etc. As one example, a LIDAR system of the sensors 3512 generates sensor data (e.g., remote-detection sensor data) that includes the location (e.g., in three-dimensional space relative to the LIDAR system) of a number of points that correspond to objects that have reflected a ranging laser. For example, the LIDAR system can measure distances by measuring the Time of flight (TOF) that it takes a short laser pulse to travel from the sensor to an object and back, calculating the distance from the known speed of light.

As another example, for a RADAR system of the sensors 3512 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, one or more cameras of the sensors 3512 may generate sensor data (e.g., remote sensor data) including still or moving images. Various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in image or images captured by the one or more cameras. Other sensor systems can identify the location of points that correspond to objects as well.

As another example, the sensors 3512 can include a positioning system. The positioning system can determine a current position of the aerial vehicle 3600. The positioning system can be any device or circuitry for analyzing the position of the aerial vehicle 3600. For example, the positioning system can determine a position by using one or more of inertial sensors, a satellite positioning system such as a Global Positioning System (GPS), based on IP address, by using triangulation and/or proximity to network access points or other network components (e.g., cellular towers, WiFi access points, etc.) and/or other suitable techniques. The position of the aerial vehicle 36000 can be used by various systems of the aerial vehicle autonomy system 3504.

Thus, the sensors 3512 can be used to collect sensor data that includes information that describes the location (e.g., in three-dimensional space relative to the aerial vehicle 3600) of points that correspond to objects within the surrounding environment of the aerial vehicle 3600. In some implementations, the sensors 3512 can be located at various different locations on the aerial vehicle 3600.

The pose system 3620 receives some or all of the sensor data from the sensors 3512 and generates vehicle poses for the aerial vehicle 3600. A vehicle pose describes the position (including altitude) and attitude of the vehicle. The position of the aerial vehicle 3600 is a point in a three dimensional space. In some examples, the position is described by values for a set of Cartesian coordinates, although any other suitable coordinate system may be used. The attitude of the aerial vehicle 3600 generally describes the way in which the aerial vehicle 3600 is oriented at its position. In some examples, attitude is described by a yaw about the vertical axis, a pitch about a first horizontal axis and a roll about a second horizontal axis. In some examples, the pose system 3620 generates vehicle poses periodically (e.g., every second, every half second, etc.) The pose system 3620 appends time stamps to vehicle poses, where the time stamp for a pose indicates the point in time that is described by the pose. The pose system 3620 generates vehicle poses by comparing sensor data (e.g., remote sensor data) to map data 3614 describing the surrounding environment of the aerial vehicle 3600.

In some examples, the pose system 3620 includes localizers and a pose filter. Localizers generate pose estimates by comparing remote sensor data (e.g., LIDAR, RADAR, etc.) to map data. The pose filter receives pose estimates from the one or more localizers as well as other sensor data such as, for example, motion sensor data from an IMU, encoder, odometer, etc. In some examples, the pose filter executes a Kalman filter or other machine learning algorithm to combine pose estimates from the one or more localizers with motion sensor data to generate vehicle poses. In some examples, localizers generate pose estimates at a frequency less than the frequency at which the pose system 3620 generates vehicle poses. Accordingly, the pose filter generates some vehicle poses by extrapolating from a previous pose estimates.

The perception system 3616 detects objects in the surrounding environment of the aerial vehicle 3600 based on the sensor data, the map data 3614 and/or vehicle poses provided by the pose system 3620. The map data 3614, for example, may provide detailed information about the surrounding environment of the aerial vehicle 3600. The map data 3614 can provide information regarding: the identity and location of geographic entities, such as different roadways, segments of roadways, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway; traffic control data (e.g., the location and instructions of signage, traffic lights, or other traffic control devices); and/or any other map data that provides information that assists the aerial vehicle autonomy system 3504 in comprehending and perceiving its surrounding environment and its relationship thereto. The perception prediction system 3618 uses vehicle poses provided by the pose system 3620 to place aerial vehicle 3600 environment.

In some examples, the perception system 3616 determines state data for objects in the surrounding environment of the aerial vehicle 3600. State data may describe a current state of an object (also referred to as features of the object). The state data for each object describes, for example, an estimate of the object's: current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the aerial vehicle 3600; minimum path to interaction with the aerial vehicle 3600; minimum time duration to interaction with the aerial vehicle 3600; and/or other state information.

In some implementations, the perception system 3616 can determine state data for each object over a number of iterations. In particular, the perception system 3616 can update the state data for each object at each iteration. Thus, the perception system 3616 can detect and track objects, such as vehicles, that are proximate to the aerial vehicle 3600 over time.

The prediction system 3618 is configured to predict future positions for an object or objects in the environment surrounding the aerial vehicle 3600 (e.g., an object or objects detected by the perception system 303). The prediction system 3618 can generate prediction data associated with objects detected by the perception system 3616. In some examples, the prediction system 3618 generates prediction data describing each of the respective objects detected by the perception system 3616.

Prediction data for an object can be indicative of one or more predicted future locations of the object. For example, the prediction system 3618 may predict where the object will be located within the next 5 seconds, 20 seconds, 200 seconds, etc. Prediction data for an object may indicate a predicted trajectory (e.g., predicted path) for the object within the surrounding environment of the aerial vehicle 3600. For example, the predicted trajectory (e.g., path) can indicate a path along which the respective object is predicted to travel over time (and/or the speed at which the object is predicted to travel along the predicted path). The prediction system 3618 generates prediction data for an object, for example, based on state data generated by the perception system 3616. In some examples, the prediction system 3618 also considers one or more vehicle poses generated by the pose system 3620 and/or the map data 3614.

In some examples, the prediction system 3618 uses state data indicative of an object type or classification to predict a trajectory for the object. As an example, the prediction system 3618 can use state data provided by the perception system 3616 to determine that particular object (e.g., an object classified as a vehicle). The prediction system 3618 can provide the predicted trajectories associated with the object(s) to the motion planning system 3622.

In some implementations, the prediction system 3618 is a goal-oriented prediction system that generates potential goals, selects the most likely potential goals, and develops trajectories by which the object can achieve the selected goals. For example, the prediction system 3618 can include a scenario generation system that generates and/or scores the goals for an object and a scenario development system that determines the trajectories by which the object can achieve the goals. In some implementations, the prediction system 3618 can include a machine-learned goal-scoring model, a machine-learned trajectory development model, and/or other machine-learned models.

The motion planning system 3622 determines a motion plan for the aerial vehicle 3600 based at least in part on the predicted trajectories associated with the objects within the surrounding environment of the aerial vehicle 3600, the state data for the objects provided by the perception system 3616, vehicle poses provided by the pose system 3620, and/or the map data 3614. Stated differently, given information about the current locations of objects and/or predicted trajectories of objects within the surrounding environment of the aerial vehicle 3600, the motion planning system 3622 can determine a motion plan for the aerial vehicle 3600 that best navigates the aerial vehicle 3600 relative to the objects at such locations and their predicted trajectories on acceptable roadways.

In some implementations, the motion planning system 3622 can evaluate cost functions and/or one or more reward functions for each of one or more candidate motion plans for the aerial vehicle 3600. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations/trajectories of objects, the motion planning system 3622 can determine a total cost (e.g., a sum of the cost(s) and/or reward(s) provided by the cost function(s) and/or reward function(s)) of adhering to a particular candidate pathway. The motion planning system 3622 can select or determine a motion plan for the aerial vehicle 3600 based at least in part on the cost function(s) and the reward function(s). For example, the motion plan that minimizes the total cost can be selected or otherwise determined. The motion plan can be, for example, a path along which the aerial vehicle 3600 will travel in one or more forthcoming time periods. In some implementations, the motion planning system 3622 can be configured to iteratively update the motion plan for the aerial vehicle 3600 as new sensor data is obtained from the sensors 3512. For example, as new sensor data is obtained from the sensors 3512, the sensor data can be analyzed by the perception system 3616, the prediction system 3618, and the motion planning system 3622 to determine the motion plan.

Each of the perception system 3616, the prediction system 3618, the motion planning system 3622, and the pose system 3620, can be included in or otherwise a part of the aerial vehicle 3600 configured to determine a motion plan based on data obtained from the sensors 3512. For example, data obtained by the sensors 3512 can be analyzed by each of the perception system 3616, the prediction system 3618, and the motion planning system 3622 in a consecutive fashion in order to develop the motion plan. While FIG. 36 depicts elements suitable for use in a vehicle autonomy system according to example aspects of the present disclosure, one of ordinary skill in the art will recognize that other vehicle autonomy systems can be configured to determine a motion plan for an autonomous vehicle based on sensor data.

The motion planning system 3622 can provide the motion plan to aerial vehicle control system 3508 to execute the motion plan. For example, the aerial vehicle control system 3508 can include pitch control module 3624, yaw control module 3626, and a throttle control system 3628, each of which can include various vehicle controls (e.g., actuators or other devices or motors that control power) to control the motion of the aerial vehicle 3600. The various aerial vehicle control system 3508 can include one or more controllers, control devices, motors, and/or processors.

A throttle control system 3628 is configured to receive all or part of the motion plan and generate a throttle command. The throttle command is provided to an engine and/or engine controller, or other propulsion system component to control the engine or other propulsion system of the aerial vehicle 3600.

The aerial vehicle autonomy system 3504 includes one or more computing devices, such as the computing device 3602 which may implement all or parts of the perception system 3616, the prediction system 3618, the motion planning system 3622 and/or the pose system 3620. The example computing device 3602 can include one or more processors 3604 and one or more memory devices (collectively referred to as memory 3608). The processors 3604 can be any suitable processing device (e.g., a processor core, a microprocessor, an Application Specific Integrated Circuit (ASIC), a Field Programmable Gate Array (FPGA), a microcontroller, etc.) and can be one processor or a plurality of processors that are operatively connected. The memory 314 can include one or more non-transitory computer-readable storage mediums, such as Random Access Memory (RAM), Read Only Memory (ROM), Electrically Erasable Programmable Read Only Memory (EEPROM), Erasable Programmable Read Only Memory (EPROM), flash memory devices, magnetic disks, etc., and combinations thereof. The memory 3608 can store data 3612 and instructions 3610 which can be executed by the processors 3604 to cause the aerial vehicle autonomy system 3504 to perform operations. The computing device 3602 can also include a communications interface 3606, which can allow the computing device 3602 to communicate with other components of the aerial vehicle 3600 or external computing systems, such as via one or more wired or wireless networks. Additional descriptions of hardware and software configurations for computing devices, such as the computing device 3602 are provided herein.

What is claimed is:

1. A battery pack comprising:
   a housing enclosing a cassette stack comprising a plurality of battery cell cassettes, each of the cassettes including a plurality of support structures, each support structure comprising:
   an electrically and thermally conductive frame supporting a first battery cell, a first terminal of the first battery cell being electrically coupled to the frame when the first battery cell is mounted in the frame;
   a heat pipe to provide thermal conductivity between the frame and a cooling surface; and
   a bridge coupling the frame to another frame, the bridge electrically insulating each the frame from the other frame.

2. The battery pack of claim 1 wherein the frame supports a second battery cell, and wherein the frame receives the first and second battery cells in an axially stacked configuration with a vent of the first battery cell facing in an opposite direction to a vent of the second battery cell.

3. The battery pack of claim 1 wherein each support structure further comprises a first electrically-conductive structure to electrically couple the frame to a terminal of a battery cell in an adjacent frame.

4. The battery pack of claim 3 wherein the frame supports a second battery cell and wherein each support structure further comprises a second electrically conductive structure to electrically couple a terminal of the second battery cell to an adjacent frame.

5. The battery pack of claim 1 wherein the frame supports a second battery cell and wherein each support structure further comprises an electrically conductive structure to electrically couple a terminal of the second battery cell to an adjacent frame.

6. The battery pack of claim 3 wherein the adjacent frame is in an adjacent cassette.

7. The battery pack of claim 1, wherein each support structure further comprises at least one foot thermally coupling the heat pipe to the cooling surface.

8. The battery pack of claim 1, wherein each frame comprises:
   at least a first cross member and a second cross member receiving the first battery cell; and
   at least one vertical member connecting the first and second cross members.

9. The battery pack of claim 1, wherein the bridge comprises a chassis including vertical dividers that separate and isolate adjacent support structures.

10. The battery pack of claim 1 wherein a plurality of bridges couple adjacent support structures one to another to form a battery cassette.

11. The battery pack of claim 10 wherein the plurality of bridges are configured to couple the adjacent support structures to each other so that the adjacent support structures face in opposite directions in the battery cassette.

* * * * *

UNITED STATES PATENT AND TRADEMARK OFFICE
CERTIFICATE OF CORRECTION

PATENT NO. : 12,057,562 B2
APPLICATION NO. : 17/119491
DATED : August 6, 2024
INVENTOR(S) : Sweet et al.

Page 1 of 1

It is certified that error appears in the above-identified patent and that said Letters Patent is hereby corrected as shown below:

In the Claims

In Column 26, Line 19, in Claim 1, after "insulating", delete "each"

Signed and Sealed this
Second Day of September, 2025

Coke Morgan Stewart
*Acting Director of the United States Patent and Trademark Office*